United States Patent [19]
Nakazato et al.

[11] Patent Number: 5,497,083
[45] Date of Patent: Mar. 5, 1996

[54] ROD AXIAL POSITION DETECTOR INCLUDING A FIRST SCALE HAVING EQUIDISTANT MAGNETIC PARTS AND A SECOND SCALE HAVING UNEQUALLY DISTANT PARTS AND DIFFERING FIELD STRENGTHS

[75] Inventors: Masakazu Nakazato; Youichi Shimoura; Masamichi Sugihara, all of Kanagawa, Japan

[73] Assignee: Kayaba Kogyo Kabushiki Kaisha, Tokyo, Japan

[21] Appl. No.: 168,096

[22] Filed: Dec. 15, 1993

[30] Foreign Application Priority Data

Dec. 24, 1992 [JP] Japan ................................ 4-344902
Apr. 14, 1993 [JP] Japan ................................ 5-087544

[51] Int. Cl.$^6$ ............................ G01B 7/14; G01B 21/02
[52] U.S. Cl. ............................ 324/207.24; 324/207.22
[58] Field of Search ..................... 324/173, 174, 324/207.15, 207.16, 207.17, 207.20, 207.21, 207.24, 207.22, 207.25; 364/560, 561; 340/672; 341/15

[56] References Cited

U.S. PATENT DOCUMENTS

| | | | |
|---|---|---|---|
| 3,132,337 | 5/1964 | Martin | 324/165 |
| 4,771,237 | 9/1988 | Daley | 324/202 |
| 4,783,627 | 11/1988 | Pagel et al. | 324/207.22 |
| 4,951,048 | 8/1990 | Ichikawa et al. | 324/207.24 |
| 4,972,332 | 11/1990 | Luebbering et al. | 340/672 |
| 5,103,668 | 4/1992 | Drutel et al. | 324/207.22 |
| 5,299,143 | 3/1994 | Hellinga et al. | 364/561 |

FOREIGN PATENT DOCUMENTS 63-95315  4/1988  Japan ................................ 324/207.24

*Primary Examiner*—Sandra L. O'Shea
*Assistant Examiner*—Roger Phillips
*Attorney, Agent, or Firm*—Jordan and Hamburg

[57] ABSTRACT

A first magnetic scale consisting of a plurality of non-magnetic parts are arranged axially at equidistant intervals, and a second magnetic scale consisting of a plurality of non-magnetic parts arranged axially at unequal intervals, are formed parallel to each other on a rod consisting of a magnetic material which can be displaced in the axial direction. The non-magnetic parts of the second scale are symmetrically disposed on both side of a predetermined position on the rod. First and second magnetic sensors are disposed in fixed positions facing the scales. A memory which individually memorizes the absolute position of each non-magnetic part on the second magnetic scale in advance, a mechanism which detects the interval between non-magnetic parts passing the second sensor, and a mechanism for distinguishing on which side the second sensor is situated with reference to the aforesaid predetermined position are provided, together with a mechanism for identifying a non-magnetic part which has passed based on the distinguishing result of the distinguishing mechanism and the detected interval, a mechanism for calculating the displacement amount of the rod from the identified magnetic part to its current position based on the output signal from the first sensor, and a mechanism for calculating the current position of the rod from the absolute position of the identified magnetic part and the calculated displacement. In this way, the displacement distance of the rod required to obtain absolute position information is reduced.

4 Claims, 23 Drawing Sheets

● : REFERENCE POINT though of the page proceeds.

ROD AXIAL POSITION DETECTOR INCLUDING A FIRST SCALE HAVING EQUIDISTANT MAGNETIC PARTS AND A SECOND SCALE HAVING UNEQUALLY DISTANT PARTS AND DIFFERING FIELD STRENGTHS

FIELD OF THE INVENTION

This Invention relates to a device for detecting the displacement position of a hydraulic cylinder piston rod by means of a magnetic scale and a sensor which responds to this magnetism.

BACKGROUND OF THE INVENTION

A position detector for detecting the linear displacement position of a piston rod in a hydraulic cylinder by means of a magnetic scale and sensor is described in, for example, Japanese Tokkai Hei 4-136713 published by the Japanese Patent Office.

In this detector, non-magnetic parts are formed at a fixed interval in an axial direction to act as a magnetic scale on the circumference of a piston rod of magnetic material, and a magnetic sensor which outputs a sine wave according to the passage of the non-magnetic parts is fixed to the cylinder.

If the absolute position at which the displacement of the piston rod starts is not known, its absolute position after displacement cannot be known. A limit switch is therefore provided at the most compressed or most elongated position of the piston rod. When the cylinder is used, i.e. when the power to the position detector is switched on, the piston rod is first brought to Its most compressed or most elongated position so as to switch the limit switch on or off. When the limit switch is switched on or off, the piston rod is detected to have reached a reference point, and the displacement of the piston rod can then be followed until the power is switched off by determining its distance from the reference point from file output signal of the magnetic sensor.

However, if the piston rod is linked to other mechanisms, the whole mechanism assembly has to suffer a large displacement in order to detect the reference point each time the power is switched on.

In Japanese Tokkai 4-71114 published by the Japanese Patent Office, a position detector is described wherein a subscale consisting of a plurality of graduations at unequal intervals is provided on the piston rod parallel to the main scale used to detect the distance through which the rod moves, a second magnetic sensor being fixed to the cylinder to detect the magnetic variation according to the motion of the subscale. In this detector, if two graduations of the subscale pass in front of the second sensor, it can be determined which graduations have passed from the interval between them. Therefore, if these graduations are taken as reference points for the distance measurement on the main scale, they can be used as a reference close to the position at which the piston rod comes to rest, thereby avoiding the trouble of moving the piston rod to the most compressed or elongated position each time the power to the detector is switched on. In this case also, once a reference point has been detected, the displacement of the piston rod can be followed until the power is switched off.

However, as all the graduations on the subscale have to be placed at unequal intervals, there will be some points on the piston where the intervals between graduations is large, and at these points the piston has to be moved through a large distance in order to obtain reference point information.

SUMMARY OF THE INVENTION

It is therefore an object of this invention to provide a position detector having a main scale and a subscale wherein the distance through which the piston rod has to move to obtain reference point information is less.

In order to achieve this object, this invention provides an axial position detector for a rod made of magnetic material, comprising a first magnetic scale consisting of a plurality of non-magnetic parts arranged axially on the rod at equidistant intervals, and a second magnetic scale consisting of a plurality of non-magnetic parts arranged axially on the rod at unequal intervals, the two scales being parallel to each other and the magnetic parts of the second scale being symmetrically disposed with reference to a predetermined position on the rod.

This position detector comprises a first magnetic sensor outputting a signal according to the displacement position of the first magnetic scale, and a second magnetic sensor outputting a signal according to the displacement position of the second magnetic scale. These magnetic sensors are respectively arranged in fixed positions facing the magnetic scales.

The position detector also comprises a memory which memorizes the absolute positions of the non-magnetic parts on the second magnetic scale In advance, a mechanism which detects the interval between the non-magnetic parts passing the second sensor based on the output signal from said second sensor, and a mechanism for distinguishing on which side the second sensor is situated with reference to the aforesaid predetermined position.

Further provided are a mechanism for identifying a non-magnetic part which has passed based on the distinguishing result of the distinguishing means and the aforesaid detected interval, a mechanism for calculating the displacement amount of the rod from the identified non-magnetic part to its current position based on the output signal from the first sensor, and a mechanism for calculating the current position of the rod from the absolute position of the identified non-magnetic part and the calculated displacement.

Preferably, the non-magnetic parts of the first magnetic scale have different depths on either side of the predetermined position on the rod. The first sensor may then comprise a sensor which outputs a signal whereof the level depends on the depth of the non-magnetic parts on the first scale, and the distinguishing mechanism comprises a device which distinguishes on which side the second sensor is situated with reference to the predetermined position based on the output signal level of the first sensor.

Alternatively, the magnetic parts of the second scale have different depths depending on either side of the predetermined position of the rod. In this case, the second sensor comprises a sensor which outputs a signal whereof the levels depend on the depth of the non-magnetic parts on the second scale, and the distinguishing mechanism comprises a device which distinguishes on which side the second sensor is situated with reference to the predetermined position based on the output signal level of the second sensor.

More preferably, the first sensor comprises two sensor units which output two sine waves having a 90-degree phase difference according to the positional change of the non-magnetic parts of the first scale. The displacement amount calculating mechanism comprises a device for calculating a center level of one from the peak values of one of the sine waves every pitch interval of the non-magnetic parts of the first scale, a device for detecting that the non-magnetic parts of the first scale have passed the first sensor based on a comparison of the sine wave and its center level, a counter which counts the number of passes the non-magnetic parts of the first scale makes, a device for correcting the sine waves such that said sine waves have equal amplitude at every pitch interval, a device for calculating the distance between the non-magnetic part which has passed the first sensor most recently and the first sensor by means of inverse trigonometric functions using the two corrected sine waves, and a device for calculating the displacement amount of the rod from the counted number of passes and the calculated distance.

DESCRIPTION OF THE PREFERRED EMBODIMENTS

Figure 1:
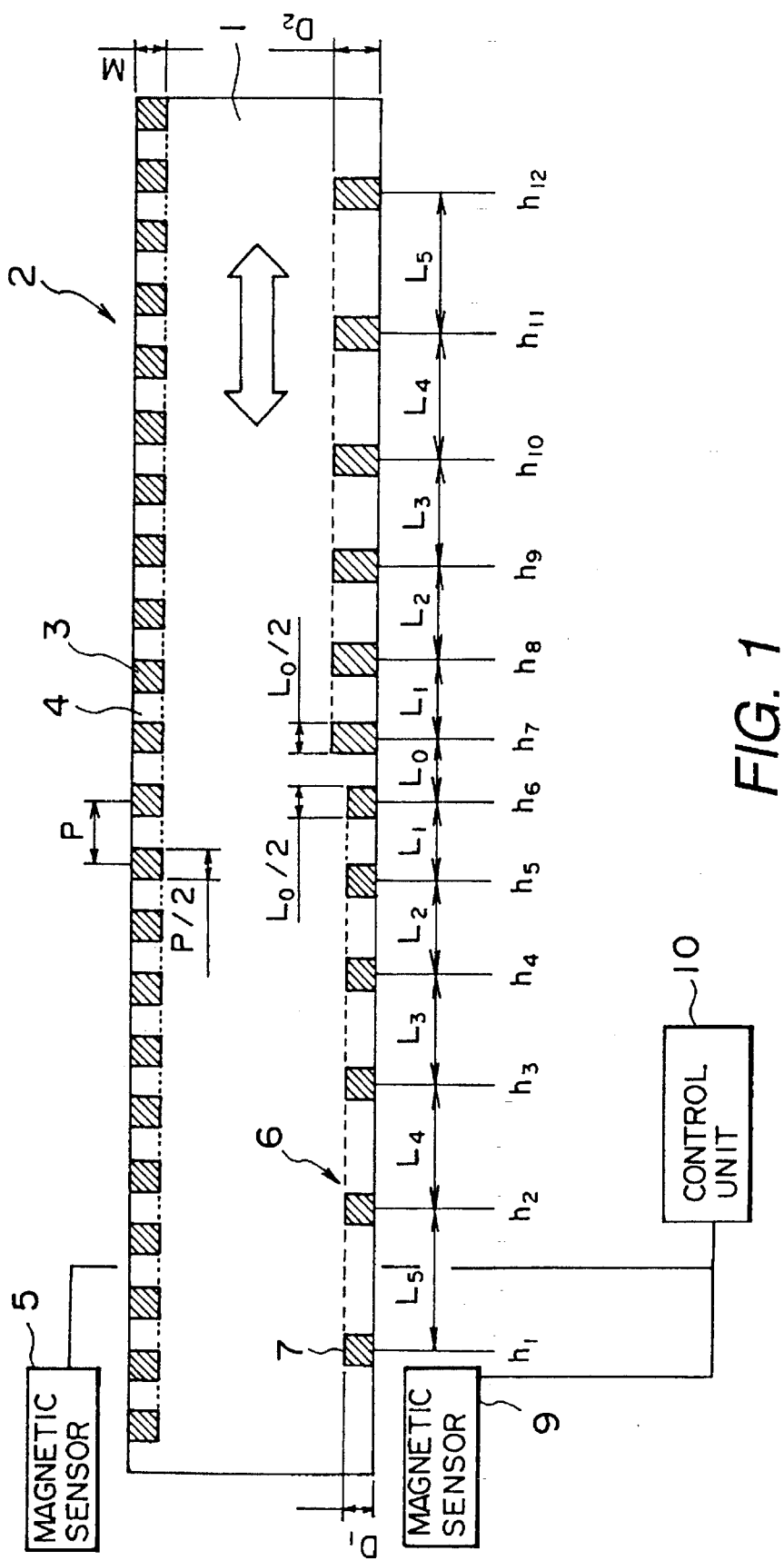
FIG. 1 is a schematic diagram of magnetic scales according to a first embodiment of this invention.

Referring to FIG. 1 of the drawings, according to the first embodiment of this invention, a piston rod 1 consisting of a magnetic material projects from the cylinder tube of a hydraulic cylinder, not shown, such that it is free to slide, and can be displaced between a most compressed position and a most elongated position according to the hydraulic pressure supplied to the hydraulic cylinder.

The piston rod 1 is provided with a main scale 2 and a subscale 6 consisting of non-magnetic parts 3 embedded on the surface of the piston rod 1.

The non-magnetic parts 3 and 7, respectively, having an equal depth M are formed at an equal pitch interval P in the axial direction on the main scale 2. Magnetic parts 4 consisting of a magnetic material which forms the piston rod 1 are interposed between these non-magnetic parts 3, the non-magnetic parts and magnetic parts 4 being disposed alternately at a width of ½ P.

The subscale 6 is formed in parallel with the main scale 2 on the circumference of the piston rod 1. The subscale 6 consists of non-magnetic parts 7 having a predetermined width disposed symmetrically to the left and right of the middle of the piston rod 1. Reference points $h_1$–$h_{12}$ are set in the center of each of the non-magnetic parts 7.

The pitch interval between the non-magnetic parts 7 at $h_6$, $h_7$ on either side of the center is $L_0$, the other non-magnetic parts 7 being arranged at progressively increasing pitch intervals $SL_1$–$L_5$ towards the outside. The width of the non-magnetic parts 7 is $L_0/2$. The depth of the non-magnetic parts 7 having the reference points $h_1$–$h_6$ to the left of the middle of the rod 1 is $D_1$, and the depth of those having the reference points $h_7$–$h_{12}$ to the right of the middle of the rod 1, is $D_2$. The value of $D_2$ is larger than that of $D_1$.

Magnetic sensors 5 and 9 are installed at fixed positions opposite the main scale 2 and subscale 6. These sensors are fixed to the cylinder tube in the hydraulic cylinder.

Figure 3:
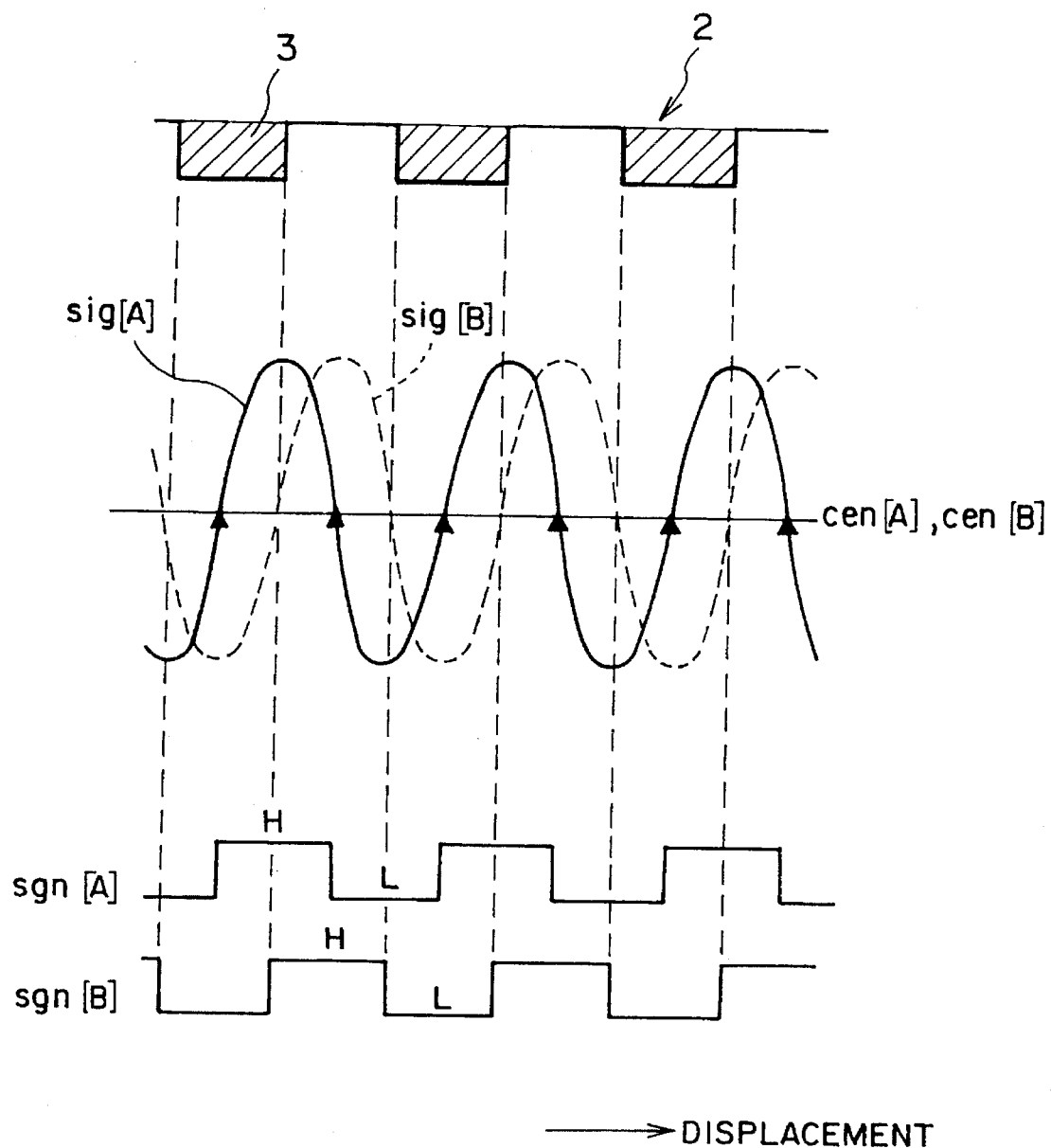
FIG. 3 is a waveform diagram of comparator outputs sgn [A] and sgn [B] according to the first embodiment.

The magnetic sensor 5 comprises a pair of sensor units which output two sine waves having a 90 degrees phase difference as voltage signals sig [A] and sig [B] with a period corresponding to one pitch interval on the main scale 2, as shown in FIG. 3. The magnetic sensor 9 comprises a pair of sensor units which output two voltage signals sig [ZA] and sig [ZB] with a 90 degrees phase difference, corresponding to the different pitch intervals of the subscale 6, as shown in FIG. 10B.

These output signals are input to a control unit 10 comprising a microprocessor.

Figure 2:
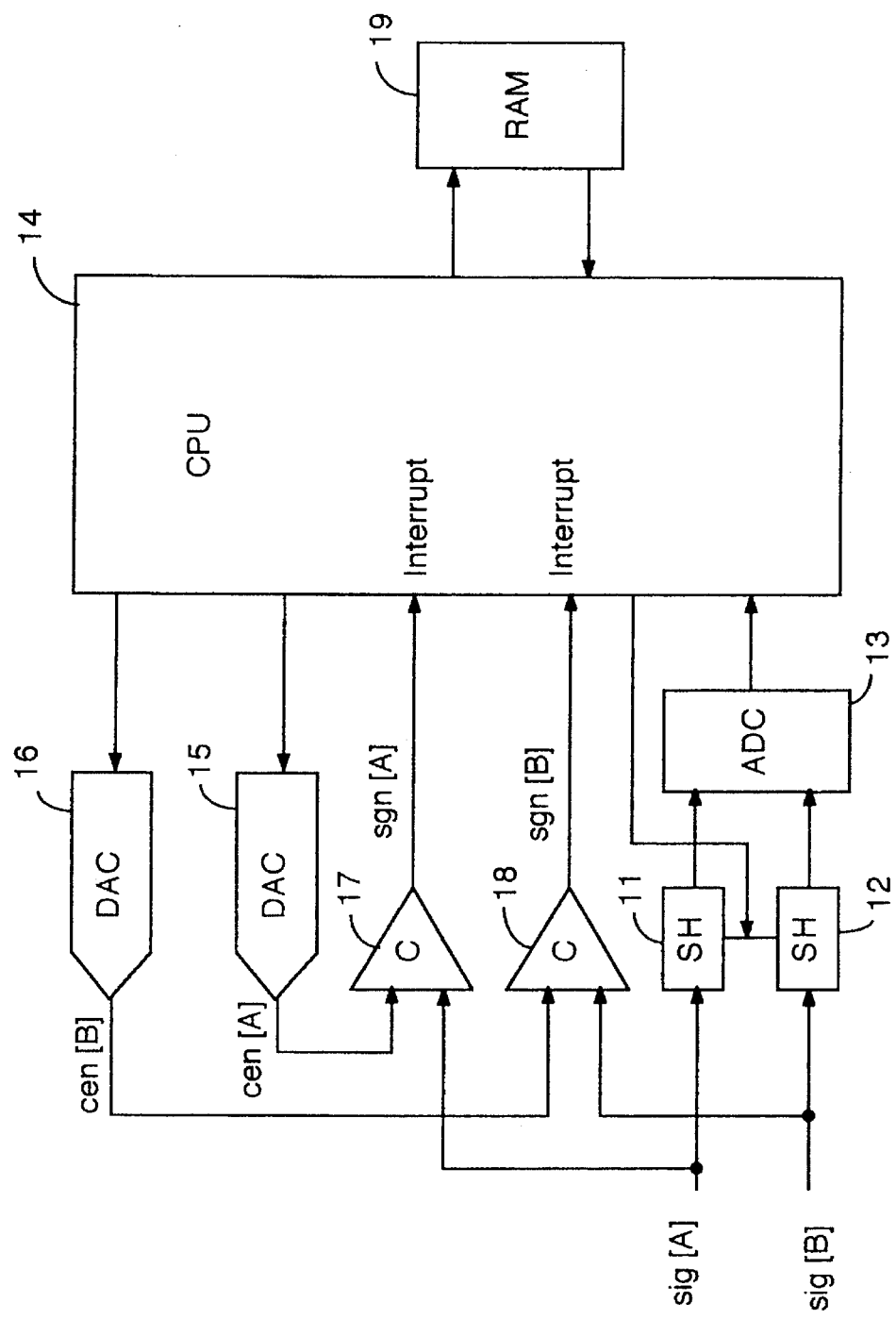
FIG. 2 is a block diagram showing a construction of a control unit for processing information from a main scale according to the first embodiment.

FIG. 2 is a block diagram of a part of the control unit 10 for processing information from the main scale 2. The two phase output signals sig [A], sig [B] from the magnetic sensor 5 are input to a CPU 14 via sample hold circuits 11, 12 and an analog/digital converter 13.

In digital/analog converters 15, 16 which are prodded for each phase, center levels (digital values) of sig [A] and sig [B] found from peak values on a slot table hereinafter described, are converted to analog voltages, and input to corresponding comparators 17, 18.

In the comparator 17 sig [A] is compared with cen [A] and in the comparator 18 sig [B] is compared with cen [B]. If the output signal is greater than the center level, the comparator 17 (18) outputs an "H" level signal, conversely if the output signal is smaller than the center level, it outputs an "L" level signal. The comparator output signals sgn [A], sgn [B] therefore vary every half pitch interval as is shown in FIG. 3.

With these signals the CPU 14 performs the following operations:

storing and updating of output signal peak values,
center level adjustment,
counting number of central level crossings by sine wave,
normalization of output signals,
computation of fine displacement from reference point,
combined processing of count number and fine displacement, and
sensor error detection.

The operations regarding this invention will now be described.

(1) Storing of output signal peak values

Figure 4:
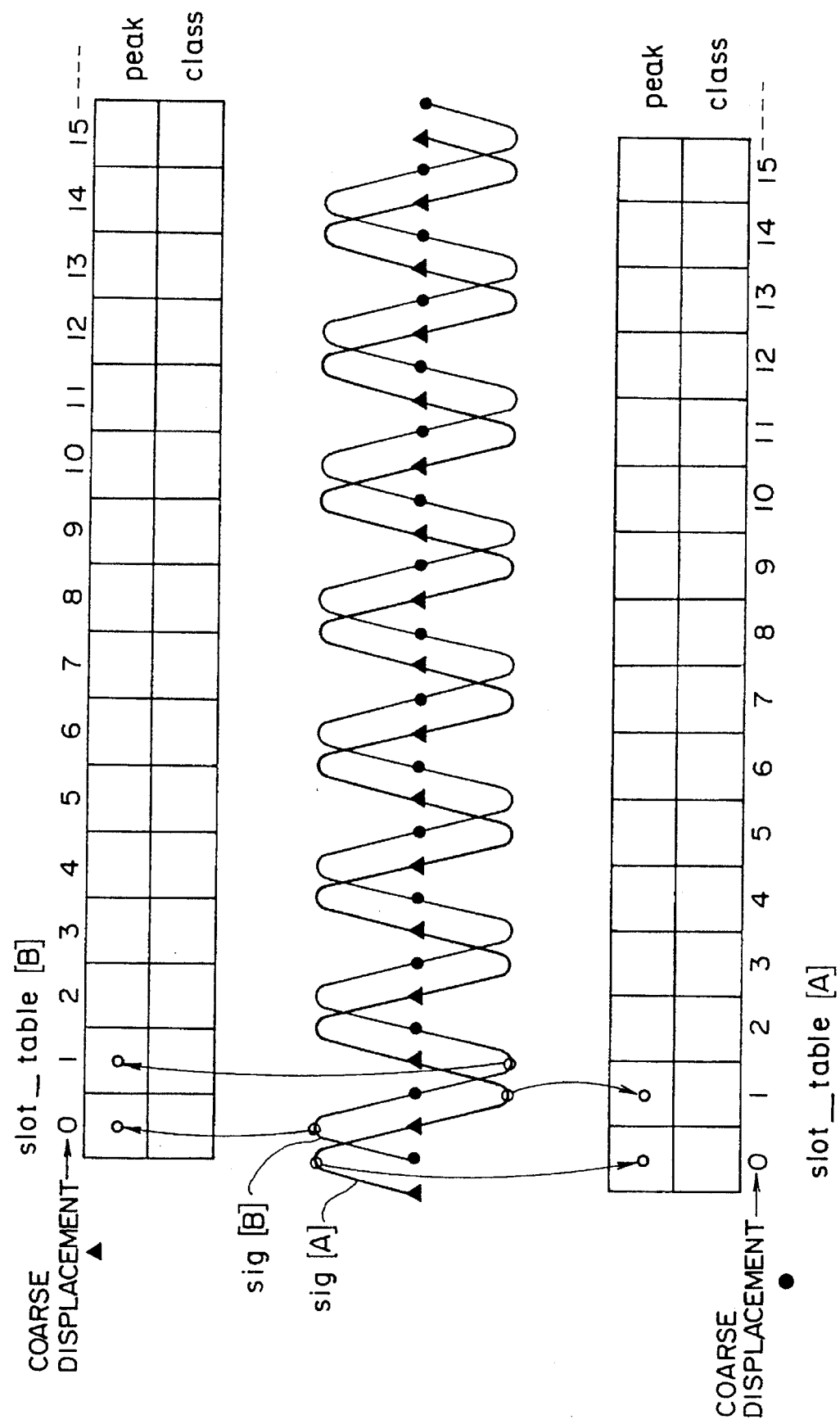
FIG. 4 is an explanatory diagram showing a storing process of peak values of main scale magnetic sensor output signals sig [A] and sig [B] in RAM according to the first embodiment.

Slot tables for storing the peak values of the output signals sig [A], sig [B] are provided in a RAM 19 for each phase as shown in FIG. 4. These slot tables [A], [B] contain maximum and minimum peak values at each pitch interval, and a class which expresses the type of peak value. The RAM 19 has a battery back-up so that the data it contains is retained even if the power to the control unit 10 is interrupted.

The peak values are first assigned such that the maxima correspond to even slot numbers, and the minima correspond to odd slot numbers. Actual measured values are then stored according to this rule. At the time of initialization, all the peak values stored are expected values.

There are three values per class, i.e., MEASURE, ESTIMATE and GUESS according to the type of peak value. When initialization is carried out, GUESS values are assigned to all positions. When measurements are performed, MEASURE values are assigned to corresponding slot number positions. When measurement results are reflected in peripheral slot tables, ESTIMATE values are assigned. The class functions as a weighting coefficient (MEASURE, ESTIMATE, GUESS) for determining new values when peak values are updated, as hereinafter described.

(2) Counting number of center level crossings by sine wave, and computation of normalization coefficient and output signal center level.

Figure 5:
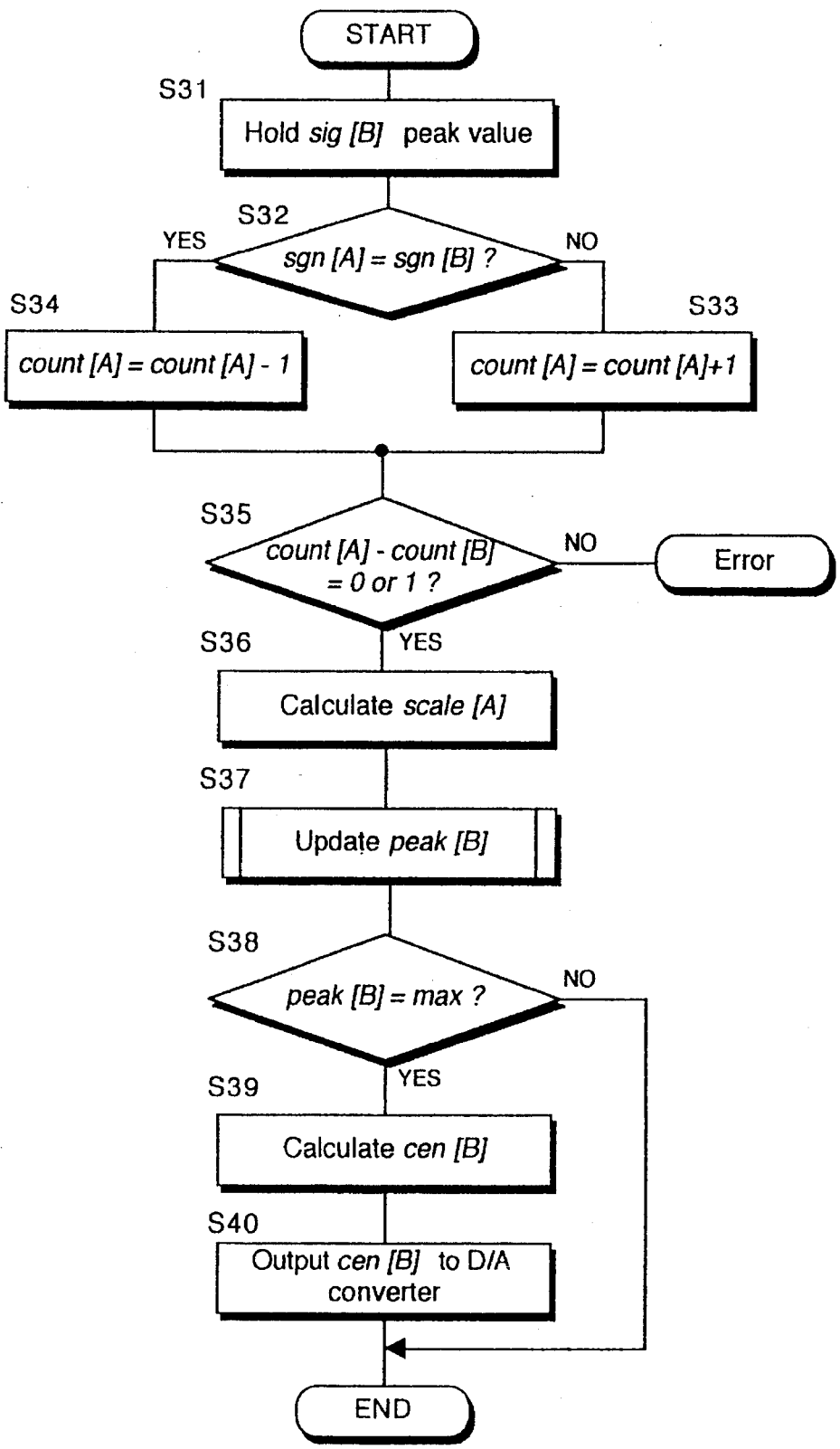
FIG. 5 is a flowchart showing a process of calculating a normalization coefficient for the signal sig [A], and a center level of the output signal sig [B], according to the first embodiment.
Figure 6:
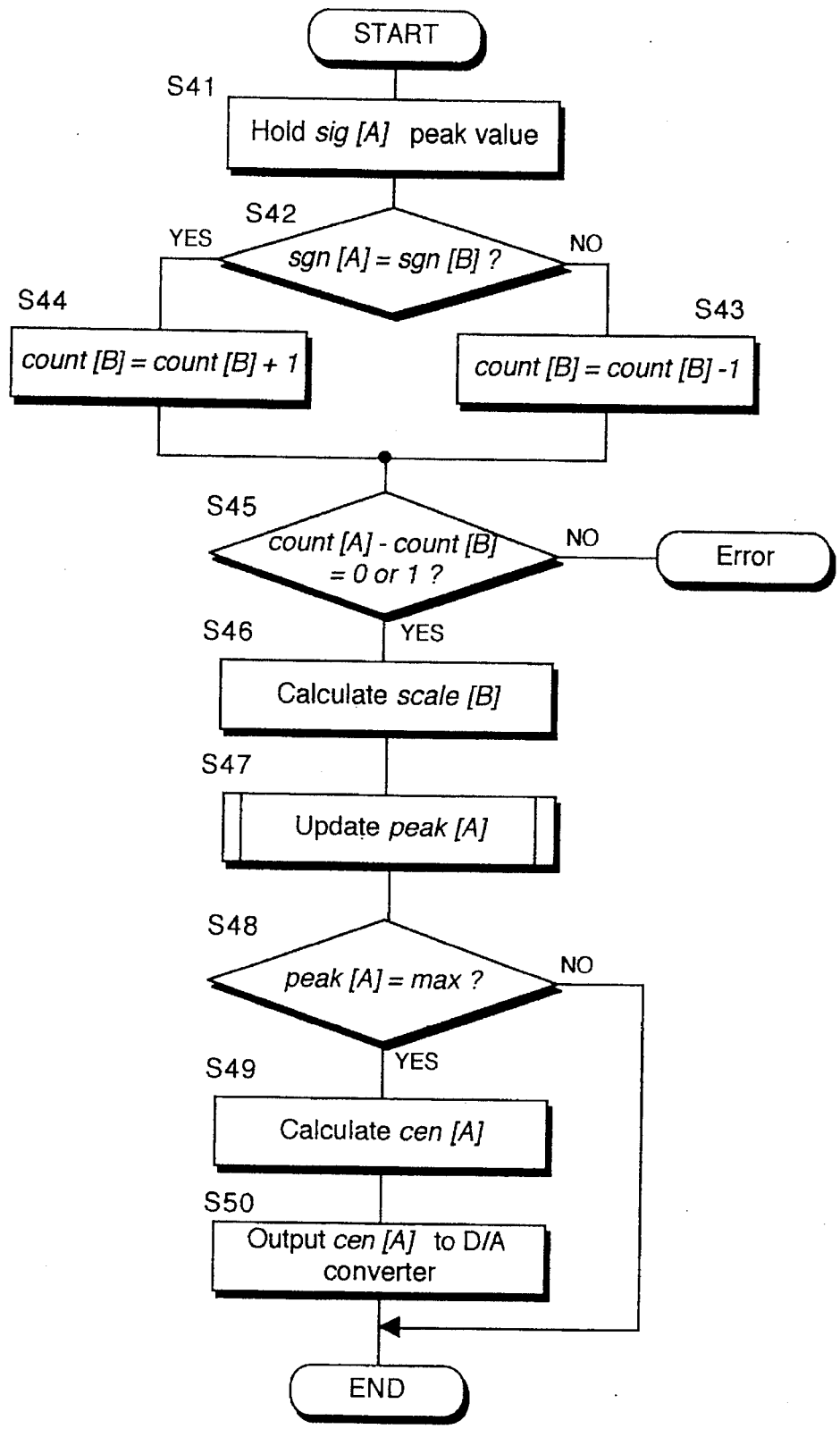
FIG. 6 is a flowchart showing a process of calculating a normalization coefficient for the signal sig [B], and a center level of the output signal sig [A], according to the first embodiment.

This procedure is executed when the output signals for each phase sig [A], sig [B] cross their center levels. FIG. 5 shows the processing when sig [A] crosses its center level, and FIG. 6 shows the processing when sig [B] crosses its center level. As the processing is the same for both output signals, the processing will be described for the case when sig [A] crosses its center.

When sig [A] crosses its center, sig [B] has either its maximum or minimum value. This value of sig [B] is therefore input to sample hold, and entered as a peak value in the parameter peak [B] (S31 in FIG. 5).

The counter value count [A] is increased or decreased depending on whether the two phase comparator output signals sgn [A], sgn [B] are identical or not (S32, 33, 34).

As there is a 90 degrees phase difference between the output signals sig [A] and sig [B], one phase either leads or follows the other depending on the displacement direction of the piston rod 1. If the direction wherein the phase of sig [A] is ahead of sig [B] by 90 degrees (left direction in FIG. 1) is taken as the forward direction, as can be seen also from FIG. 3, the comparator output signal sgn [A] immediately after the output signal sig [A] crosses the center level has a different value from the other comparator output signal sgn [B]. On the other hand, the comparator output signals sgn [A] and sgn [B] immediately after sig [B] crosses the center level are identical when the piston rod 1 is displaced in the forward direction. When the piston rod is displaced in the forward direction, therefore, the counter value count [A] is increased, and when it is displaced in the reverse direction, the counter value count [A] is decreased. This processing is given priority by the CPU.

The counter value count [A] and the value count [B] are first initialized so that the difference between them is either 0 or 1. If the difference count [A]–count [B] is not 0 or 1, therefore, it may be concluded that there is a fault such as a break in a sensor signal cable (S35).

The counter value count [A] changes when the output signal sig [A] crosses its center level cen [A]. The center level cen [A] is found from the average value of several maximum and minimum values stored in the slot table [A]. From these peak values and cen [A], a normalization coefficient scale [A] is calculated (S36) using the following equation:

$$\text{scale}[A]=1/|\text{peak value}-cen[A]|$$

This normalization coefficient scale [A] is intended to correct the difference of amplitude for each pitch interval of the main scale to the same level, and is used for computing the fine displacement hereinafter described. If for example the normalized value of |peak value–cen [A]| is 1, and a measured value was twice this magnitude, the normalization coefficient is ½. When the measured value is multiplied by this coefficient, the amplitude is corrected to 1, and is thereby adjusted to be the same level as the normalized amplitude.

Further, it is determined whether or not the peak value peak [B] of the output signal sig [B] is a maximum value, and if so, the center level cen [B] of the output signal sig [B] is computed (S38, 39). The center level is computed as the average of the maximum and minimum values over several pitch intervals. This computation result is output as the center level cen [B] to the digital/analog converter 16 in FIG. 2 (S40).

The processing of the counter value count [B] when sig [B] crosses the center level is also performed as shown in FIG. 6. In this case, however, the counter value is increased when sgn [A] and sgn [B] are identical, and decreased when sgn [A] and sgn [B] are different.

(3) Updating of output signal peak value

Figure 7:
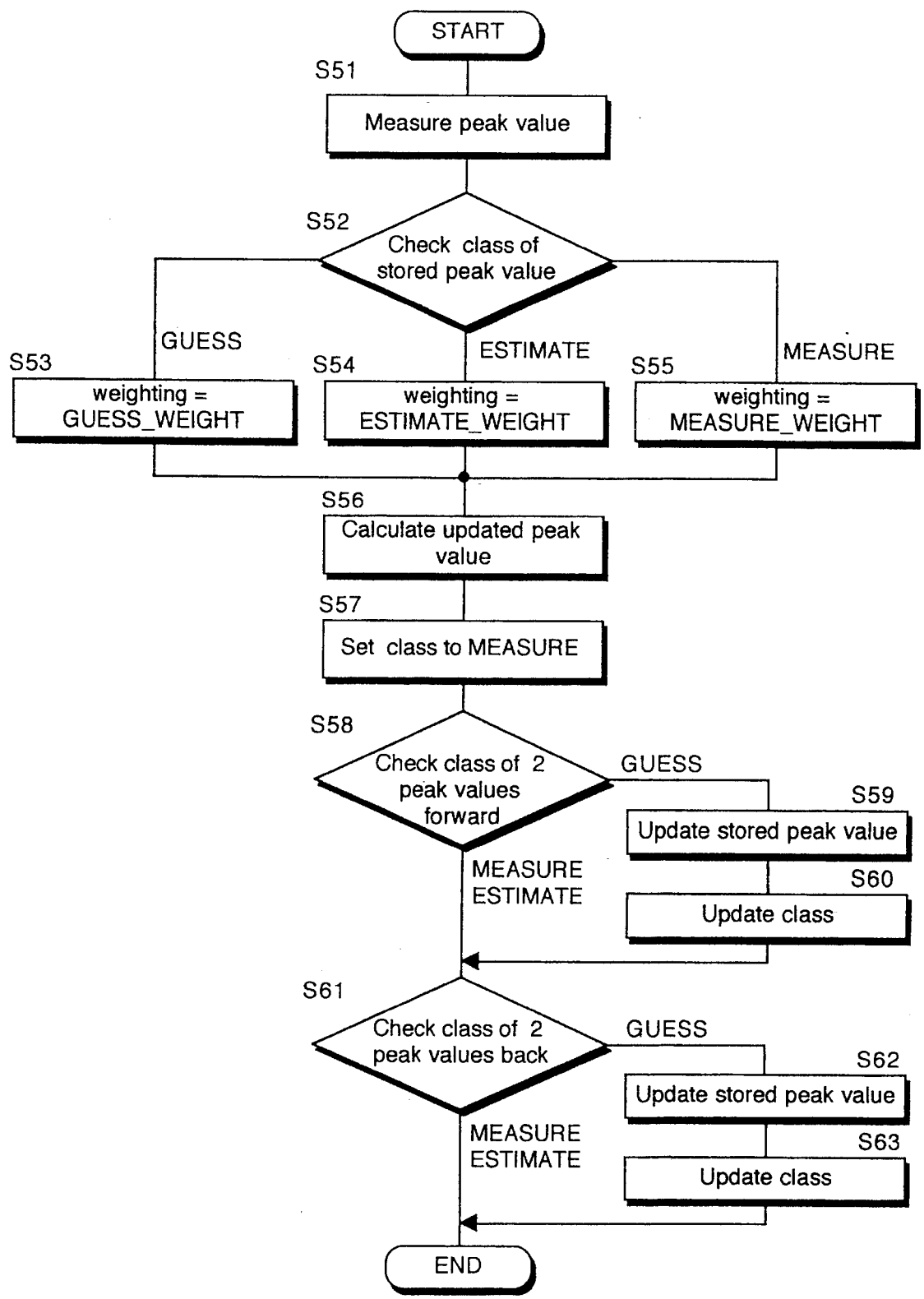
FIG. 7 is a flowchart showing a process of updating the peak values of sig [A] and sig [B] according to the first embodiment.

FIG. 7 shows the updating of peak values of both phases, but as updating is performed on the other signal when the first signal crosses its center level, the updating is here represented by the output signal [B] (S37 in FIG. 5).

In FIG. 7, the peak value of the output signal [B] which has been stored in peak hold when the output signal [A] is crossing its center, is A/D converted, and read as a peak value peak [B] (S51). If this peak value corresponds, for example, to the sixth value, a weighting coefficient (MEASURE WEIGHT, ESTIMATE WEIGHT or GUESS WEIGHT) corresponding to the value of the sixth class (MEASURE, ESTIMATE or GUESS) is selected, and entered in the parameter weight (S52–55).

The sixth peak value is then updated based on the value of this parameter and another weighting coefficient T WEIGHT using the following equation (S56):

Updated value=(original value*T WEIGHT+peak[B]*weight)/(T WEIGHT+weight)

The sixth class is replaced by the measured value MEASURE (S57).

The above weighting coefficients T WEIGHT, MEASURE WEIGHT are normally 1, otherwise they are chosen to satisfy the relation MEASURE WEIGHT<ESTIMATE WEIGHT<GUESS WEIGHT.

Further, If the class of the two peak values which immediately follow and the two peak values which immediately precede the current slot number is GUESS, the current updated peak value (i.e. the sixth peak value which has just been updated) is stored instead of the previously stored peak value, and by updating the class is changed to ESTIMATE. With this process the stored peak value in the slot table approaches the real value earlier (S58–63).

(4) Combination of fine displacement and count number

This processing is performed at fixed intervals.

Figure 8:
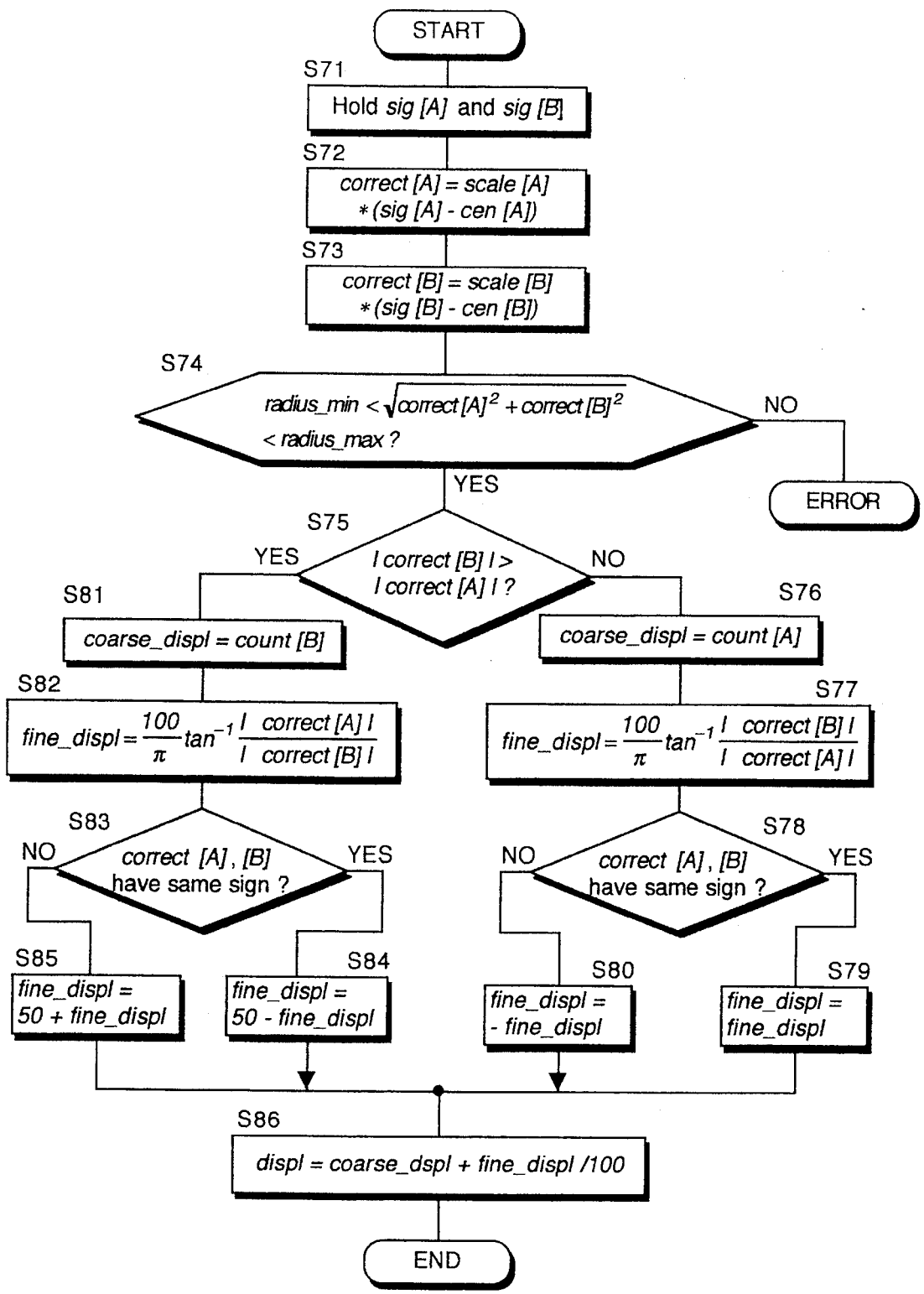
FIG. 8 is a flowchart showing a process of calculating a displacement amount according to the first embodiment.

As shown in FIG. 8, after first applying sample hold simultaneously to both phase output signals, A/D conversion is sequentially performed on the signals, which are then read together as the phased output signals sig [A], sig [B] (S71).

The normalized amplitude signals using the output signals, center levels and the above normalization coefficient, i.e. correct [A], correct [B], are then respectively calculated (S72, 73) by means of the following equations:

correct[A]=scale[A]*(sig[A]−cen[A])

correct[B]=scale[B]*(sig[B]−cen[B])

The normalized signals correct [A], correct [B] should have the relation correct$^2$ [A]+correct$^2$ [B]=1. If this value does not fall within a certain range around 1, it is determined that there is a fault, i.e. a wire break or short circuit in the magnetic sensor 4 (S74). This range may be decided by considering noise tolerance levels, and the permitted range for the phase difference between the output signals.

Figure 9:
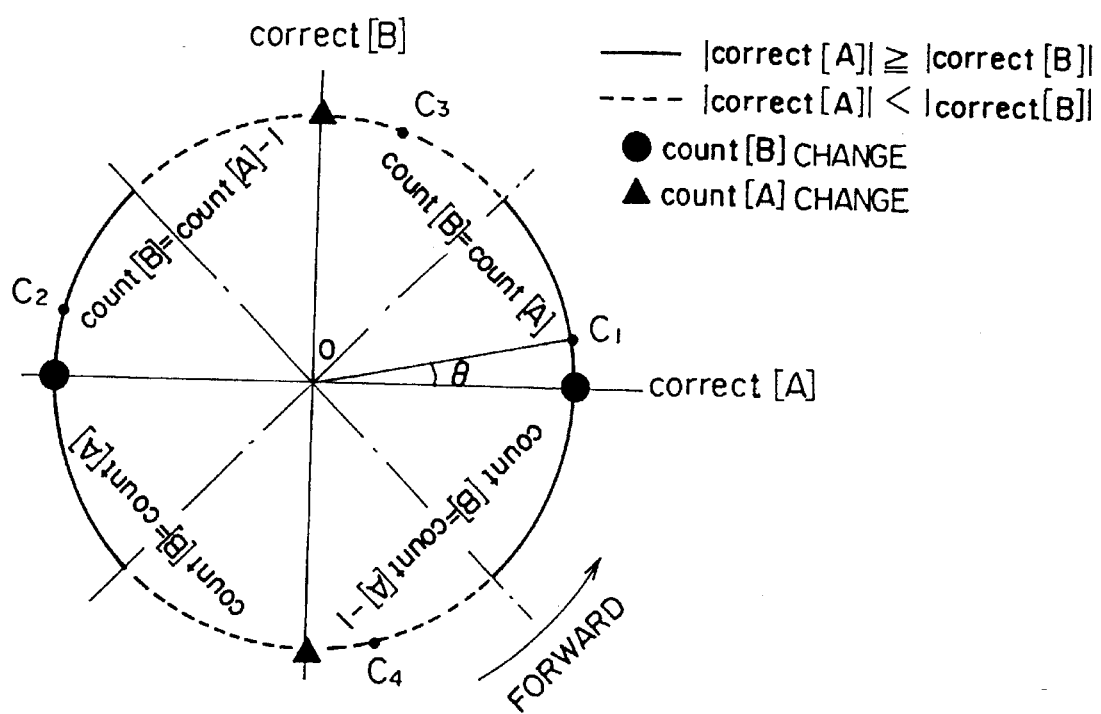
FIG. 9 is an explanatory diagram illustrating a calculation of normalization signals correct [A] and correct [B] according to the first embodiment.

The displacement of the piston rod is computed from the normalized signals correct [A], correct [B] using the graph in FIG. 9. Describing this in simple terms, if for example the pitch interval of the non-magnetic parts 3 of the main scale 2 is 2 mm, counting is performed in 1mm units. If this unit is divided into 100 parts, a fine displ for the current point $C_1$ in FIG. 9 is obtained from the relation θ:π=fine displ:100. This relation is rewritten as:

fine displ=(100/π)*θ

The following equation is also obtained:

tan θ=|correct[B]|/|correct[A]|

θ=tan$^{-1}$|correct[B]|/|correct[A]|

As a result, the fine dspl is expressed as follows:

fine displ=(100/π)*tan$^{-1}$(|correct[B]|/|correct[A]|)

From this equation, using the normalized signals correct [A], correct [B], the displacement from the center of the non-magnetic part 3 at the point $C_1$ is calculated. The displacement of the piston rod 1 may thus be found by adding the fine displacement calculated by the above inverse trigonometric function, to the coarse displacement found from the count number (S86) using the following relation:

Total displacement[mm]=Coarse displacement+(fine displacement/100)

The actual fine displacement is different according to which of the eight zones divided by the vertical axis, horizontal axis and 45 degrees lines shown in FIG. 9, it comprises the current point. At the points $C_2$, $C_3$, $C_4$, it may be calculated by the relations:

Fine displacement at $C_2$=−fine displacement

Fine displacement at $C_3$=50−fine displacement

Fine displacement at $C_4$=50+fine displacement

A distinction is therefore made according to the zone of FIG. 9 in which the Z current point lies, and depending on the result, the equations giving the fine displacement at the points $C_1$–$C_4$ are used selectively (S78–80, S83–85).

Concerning the coarse displacement, a coarse displacement counter value is selected depending on a comparison of absolute values of the two normalized signals (S75, 76, 81).

In the region where |correct[B]|≦|correct[A]|, the counter value count [A] is entered in a parameter coarse displ, which indicates the coarse displacement; in the region where |correct[B]|>|correct[A]|, the counter value count [B] is entered in the parameter coarse displ (S75, 76 and S75, 81).

In this way, the peak values of the two phase output signals are stored and updated in slot tables in the RAM 19 for each pitch interval of the main scale 2 over the whole displacement range of the piston rod 1. Based on this information, the center levels are suitably adjusted and the output signals normalized so that the displacement of the piston rod can be detected with high precision even if the magnetic output signal fluctuates.

In order to convert the above relative values to absolute values, however, the control unit 10 performs the following processing based on the signal from the magnetic sensor 9 which responds to the subscale 6.

Figure 10A:
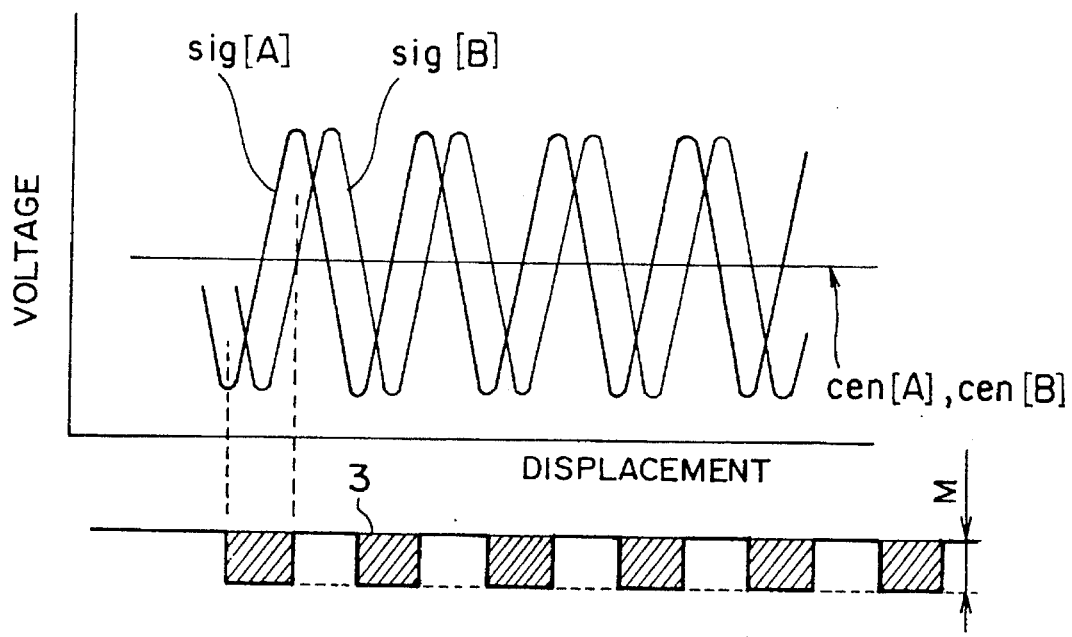
FIG. 10A is a waveform diagram showing the output signals of the main scale magnetic sensor sig [A] and sig [B], according to the first embodiment.
Figure 10B:
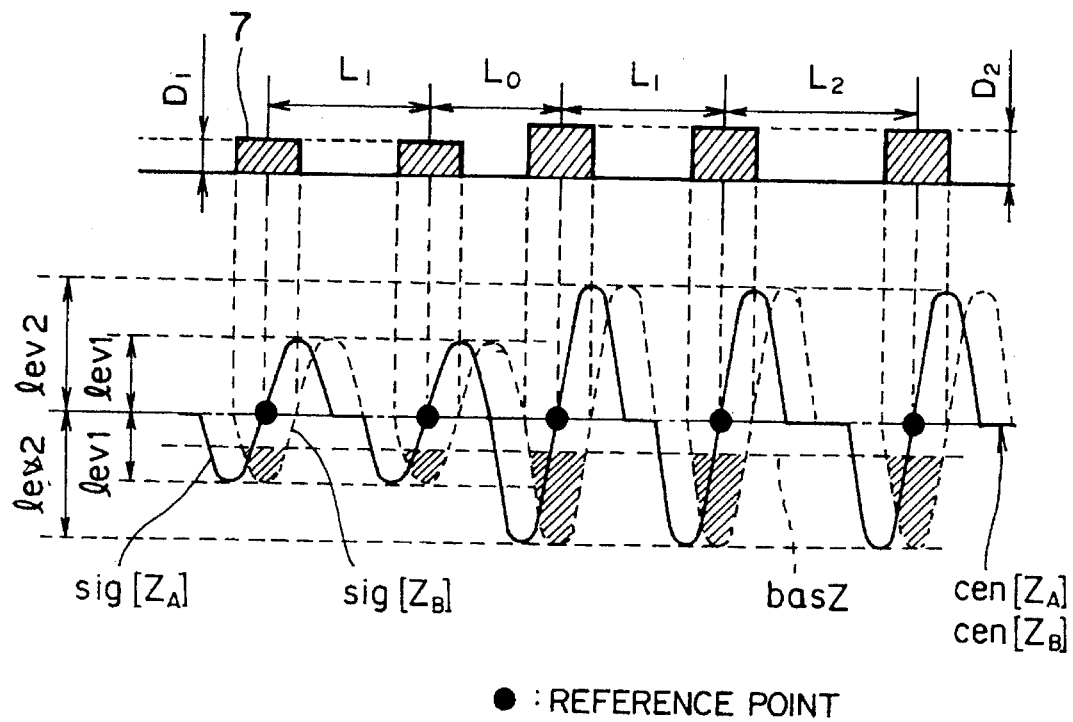
FIG. 10B is a waveform diagram showing output signals sig [ZA] and sig [ZB], and an amplitude determining level basZ of a subscale magnetic sensor, according to the first embodiment.

In the case of the two phase reference signals sig [ZA], sig [ZB] from the magnetic sensor 9, the control unit 10 takes the point at which sig [ZA] crosses the center level cen [ZA] as a reference point corresponding to the center position of the non-magnetic parts 5, as shown in FIG. 10A and 10B. It also confirms that sig [ZB] at this time does not exceed a predetermined level basZ.

The above level basZ may be found, using the center level cen [ZB] and the amplitude level lev 1 when the depth of the non-magnetic parts is $D_1$, from the equation:

basZ=cen[ZB]−(lev 1/2)

Figure 11:
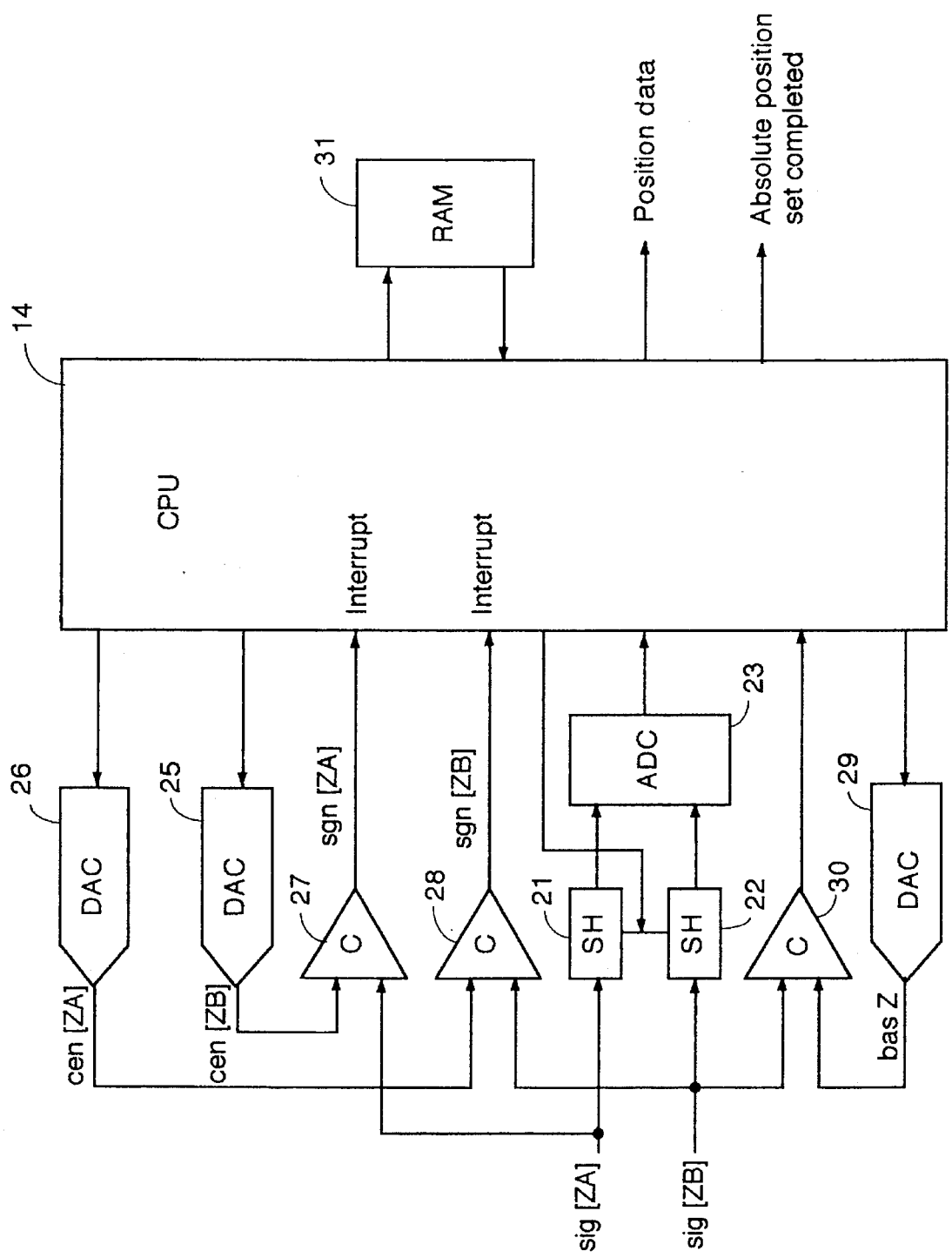
FIG. 11 is similar to FIG. 2, but showing a construction of the control unit for processing information from the subscale according to the first embodiment.

FIG. 11 shows a block diagram of the part of the control unit 10 concerned with processing information from the subscale 6. This has effectively the same layout as FIG. 2 for processing information from the main scale 2. For example, the point where the output signal sgn [ZA] from the comparator 27 changes, is the center crossover point for the output signal sig [ZA].

When an interruption signal is output at the center crossover point for the output signal sig [ZA], the CPU 14 checks the output of the comparator 30, and if an "L" level is output, the software determines that this point is the reference point. It also determines whether the amplitude level at the center crossover point for the output signal sig [ZA] corresponds to the depth $D_1$ or $D_2$ of the non-magnetic parts 7. The set value corresponding to the depth $D_1$ is lev 1, the set value corresponding to the depth $D_2$ is lev 2, and lev 1<lev 2. For example, if the amplitude level of the output signal sig [ZB] exceeds (lev 1+lev 2)/2, it is determined to be lev 2, and if it is less than this value, it is determined to be lev 1.

Figure 15:
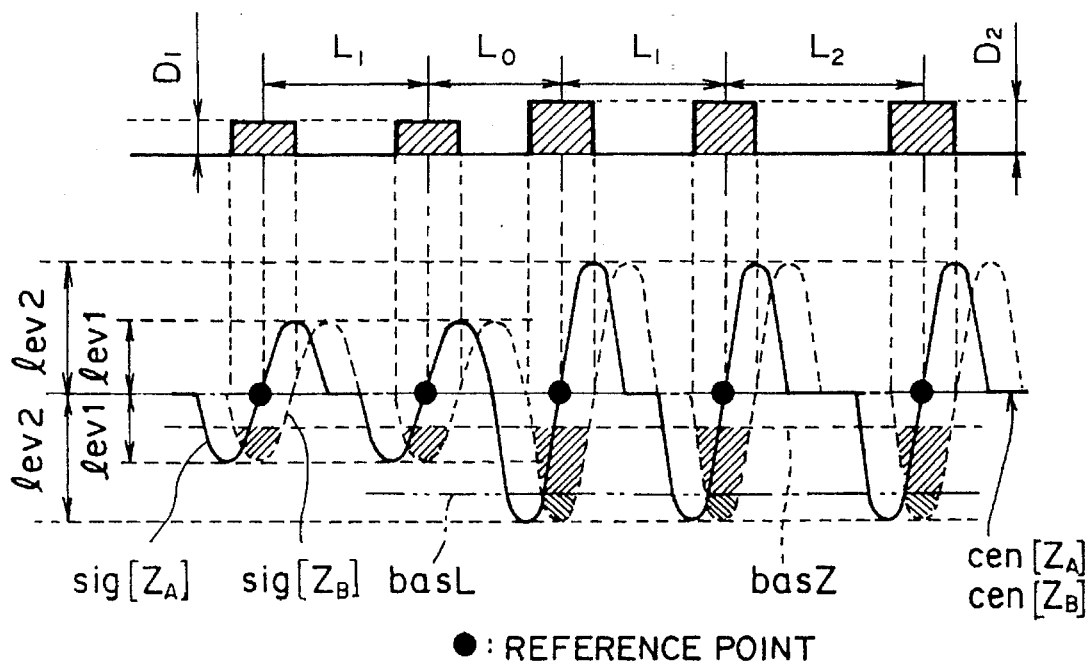
FIG. 15 is similar to FIG. 10B, but showing another amplitude determining level basL.

The determining of the amplitude level to which the amplitude of the output signal sig [ZB] corresponds, may also be performed as follows. If a predetermined amplitude determining level basL as shown in FIG. 15 is calculated from the equation:

$$basL=cen[ZB]-(lev\ 1+lev\ 2)/2$$

Figure 16:
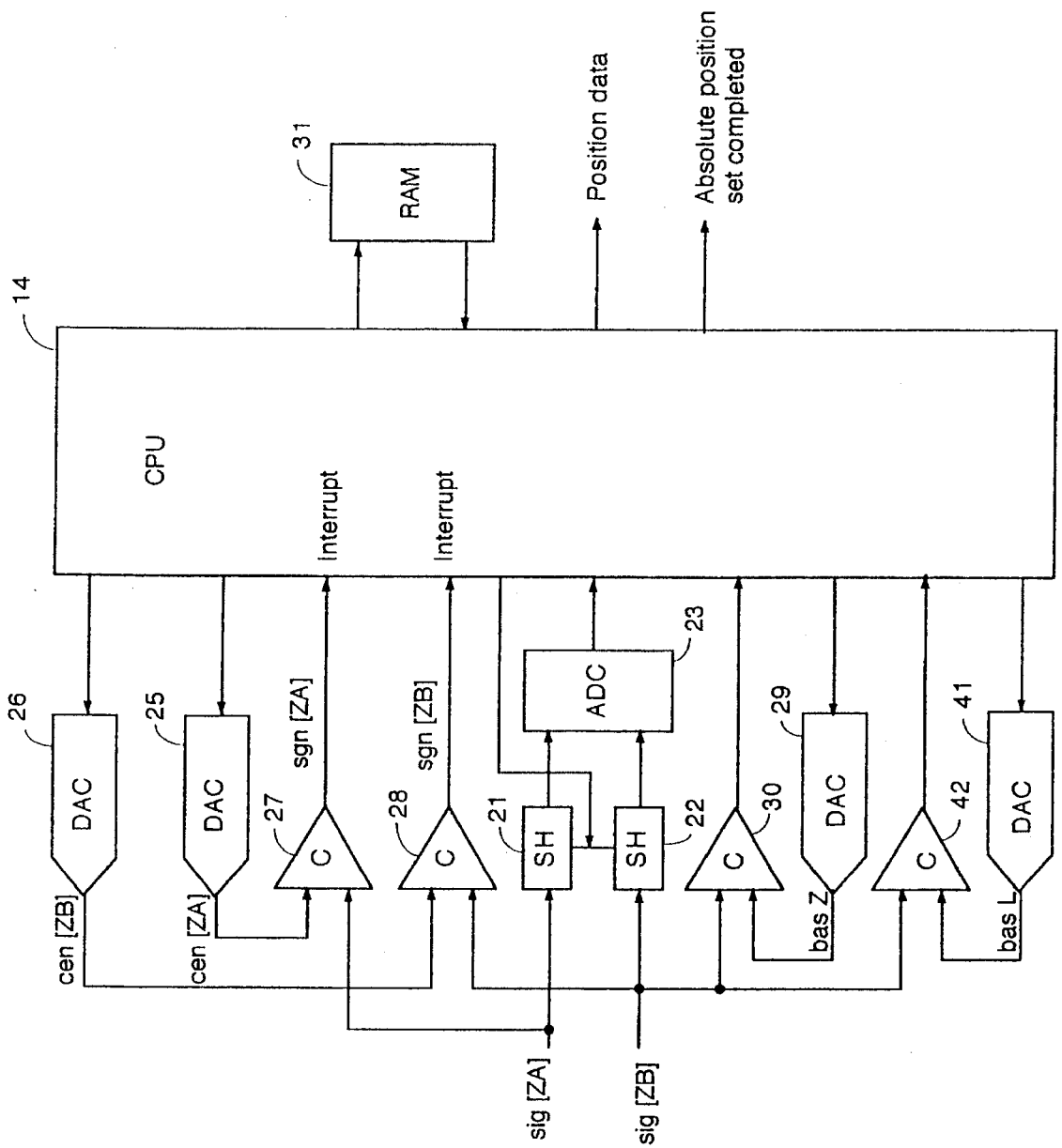
FIG. 16 is similar to FIG. 11, but showing a different construction of the control unit.
Figure 17:
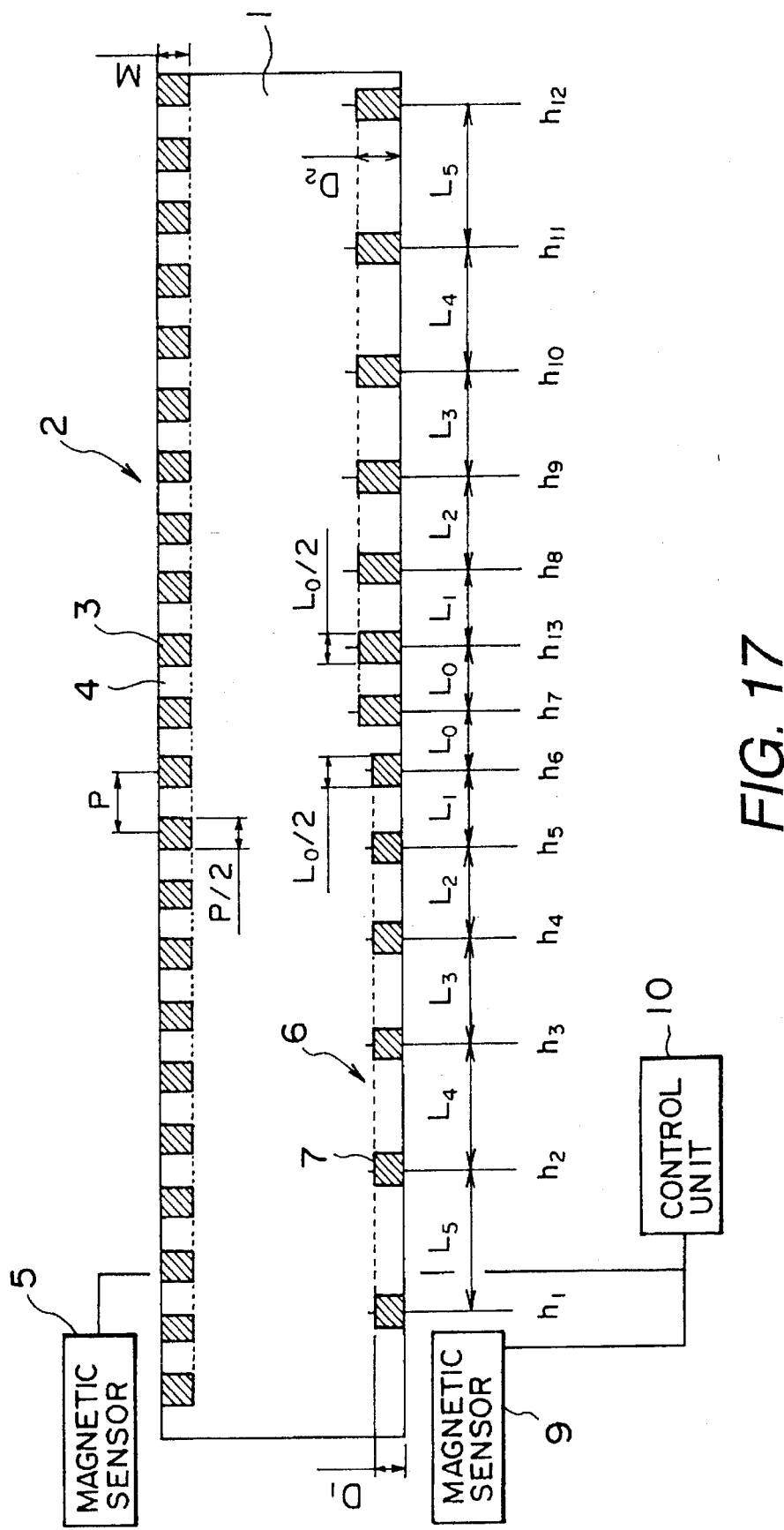
FIG. 17 is similar to FIG. 1, but showing a different arrangement of the subscale.

From this amplitude determining level basL and the magnitude of the output signal sig [ZB], the amplitude may be determined as lev 2 when basL>sig [ZB], and lev 1 in other cases. Moreover, this determining may be performed using hardware as shown in FIG. 16. In this case, a digital/analog converter 41 for analog detection of basL, and a comparator 42 for comparing the converter output with the output signal level sig [ZB], are provided. Whether software or hardware is used, however, the determining of amplitude level must be performed at the center crossover point of the output signal sig [ZA], i.e. when the reference point is detected.

A RAM 31 of FIG. 11 stores the peak values of output signals sig [ZA], sig [ZB] and the absolute position data corresponding to the reference points. This RAM 31 has a battery back-up so that its contents are retained even if the power to the control unit 10 is interrupted.

The other elements in FIG. 11 apart from the CPU 14, comparator 30 and D/A converter 29 are provided to determine the peak values and center levels of the output signals sig [ZA], sig [ZB], and are identical to the elements used to determine the peak values and center levels of the main scale.

Figure 12:
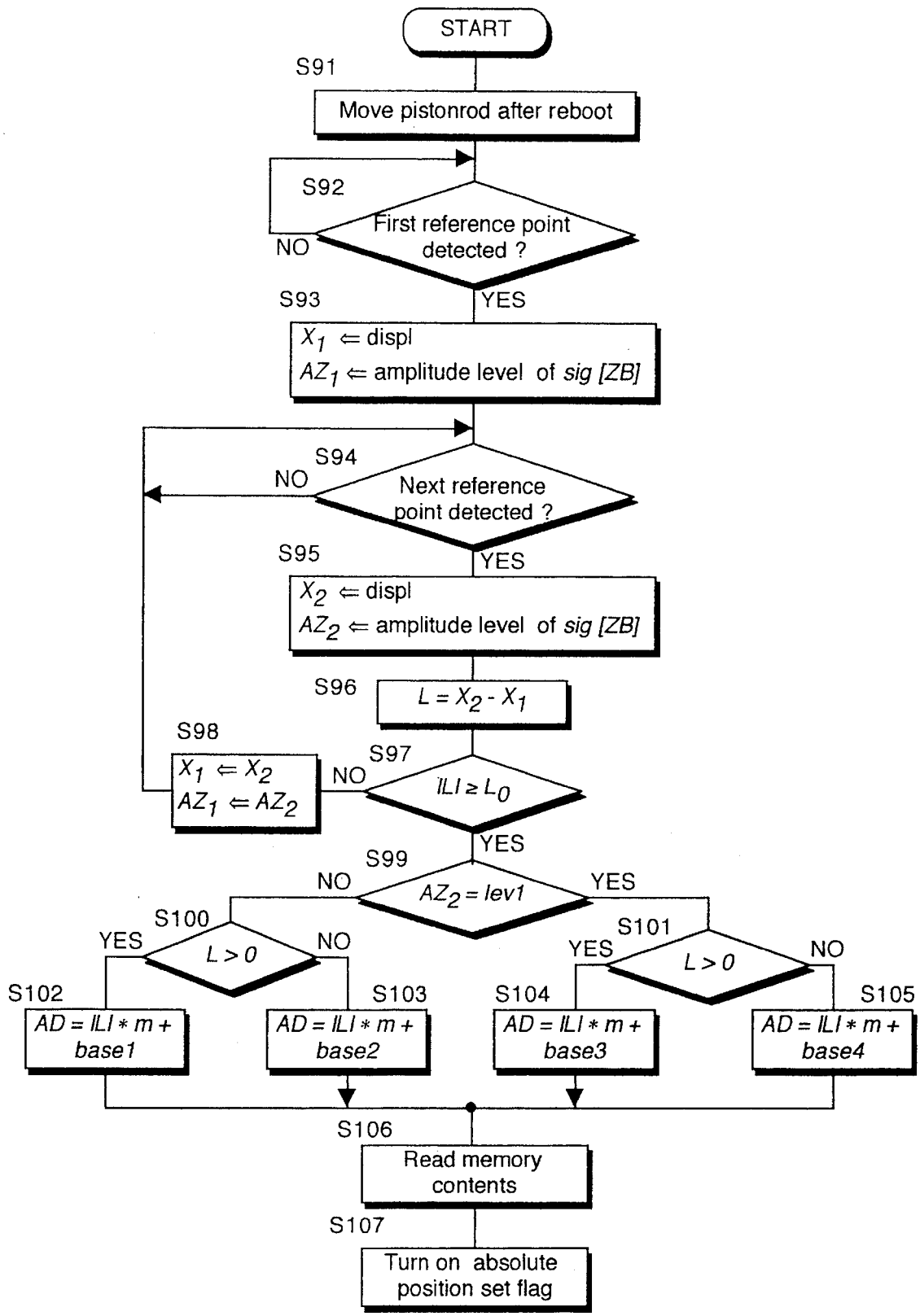
FIG. 12 is a flowchart showing a reference point detection process of the control unit according to the first embodiment.

When power to the CPU 14 is restored, the control unit 10 performs the processing in FIG. 12 (S91).

First, a first reference point is detected by giving the piston rod 1 a movement in either direction, and the displacement at that time is computed based on the output signals sig [A], sig [B] from the main scale 2. The updated value of the displacement data (displ calculated in the step 86 of FIG. 8) is then entered in a parameter $X_1$, and the amplitude level of the output signal sig [ZB] is entered in a parameter $AZ_1$, (S92, 93).

When a second reference point is detected, the updated value of the displacement data (displ calculated in the step 86 of FIG. 8) is entered in a parameter $X_2$, and the amplitude level of the output signal sig [ZB] is entered in the parameter $AZ_2$ (S94, 95). The interval between the reference points is then calculated from the two parameters $X_1$, $X_2(=X_2-X_1)$(S96).

The reference point is detected when the signal sig [ZA] is equal to the center level cen [ZA] and the signal sig [ZB] does not exceed the predetermined level basZ.

Next, it is determined whether the value of the parameter $AZ_2$ corresponds to either the amplitude level lev 1 or lev 2, and whether the sign of the reference point interval L is positive or negative (S99, 100, 101).

This is because in FIG. 1, a distinction can be made between four zones:

(i) $AZ_2$=lev 2 and L>0

(ii) $AZ_2$=lev 1 and L>0

(iii) $AZ_2$=lev 1 and L<0

(iv) $AZ_2$=lev 2 and L<0 depending on the zone and direction in which the piston rod 1 moves. For example, if the piston rod 1 is effectively in the center position of the full displacement range when power is restored, movement to the left of FIG. 1 corresponds to zone (i), whereas movement to the right corresponds to zone (iii). Likewise, if the piston rod 1 is at a position close to that shown in FIG. 1, movement to the left when power is restored corresponds to zone (ii), whereas if the right-hand end of the piston rod 1 in FIG. 1 is at the sensor position, movement to the right corresponds to zone (iv).

This zone determining is performed because when the piston rod 1 moves after the power to the CPU 14 is interrupted, it is impossible to know the position of the piston rod 1 when power is restored.

The case $|L|<L_0$ corresponds to crossing the same reference point twice in succession. In this case, it is determined that the reference point interval cannot be accurately calculated, the value of $X_2$ is entered in $X_1$, the value of $AZ_2$ is shifted to $AZ_1$, and the program returns to the step S94 so that zone determining is not performed.

If it is known which zone comprises the current point, the following calculations may be performed from the absolute value |L| of the reference point interval for each of the zones (S100, 102, 103 or S101, 104, 105):

In zone (i), AD=|L|* m+base 1

In zone (ii), AD=|L|* m+base 3

In zone (iii), AD=|L|* m+base 4

In zone (iv), AD=|L|* m+base 2

Herein, base 1–base 4 are preset constants (integers) depending on the zone.

AD indicates a storage address in the RAM 31 containing absolute value positions of the second reference point (i.e. the one detected later). As shown by the memory map of FIG. 13, for example, the second reference point in zone (i) ($AZ_2$=lev 2 and L<0 ) is $h_7$, $h_8$, $h_9$, $h_{10}$, $h_{11}$ or $h_{12}$, i.e. there are six cases. Absolute position data corresponding to these cases are stored in advance in the same number of storage locations in the RAM 31.

Further, if for example the second reference point is $h_8$, the absolute position data for $h_8$ are found in the storage location for the address AD which is calculated from $L_1$, i.e. AD=$L_1$ * m+base 1. In other words, the values of the constant m and base 1–4, are matched in advance to the addresses AD which store the absolute positions of the reference points.

The number of second reference points detected in each of the zones (i)–(iv) and an identical number of storage locations are thus set aside in the RAM 31, and absolute positions corresponding to each case are stored in advance.

The contents of the RAM 31 are therefore searched by means of the calculated addresses AD, and the absolute positions stored in the corresponding addresses are read.

Further, computed displacements (e.g. counter values) are rewritten based on the output signal from the magnetic sensor 5 when the second reference point is detected (S106). This rewriting of displacement data is performed only once after power is restored.

If the piston rod 1 moves for some reason after the power is interrupted, the actual displacement positions of the rod 1 after movement will no longer match the displacements which are computed based on the output of the magnetic sensor 5. However, by rewriting the displacement data using this absolute position data, they will again agree. This means that the absolute positions are reset each time the power is restored.

When the rewriting of absolute position data is complete, the CPU 14 outputs this information to external devices (S107). In this way, position detection from when power is restored to when absolute positions are rewritten, is distinguished from subsequent position detection.

However, to use the absolute position data in the location indicated by the above address AD, the data in that location has to be initialized.

Figure 14:
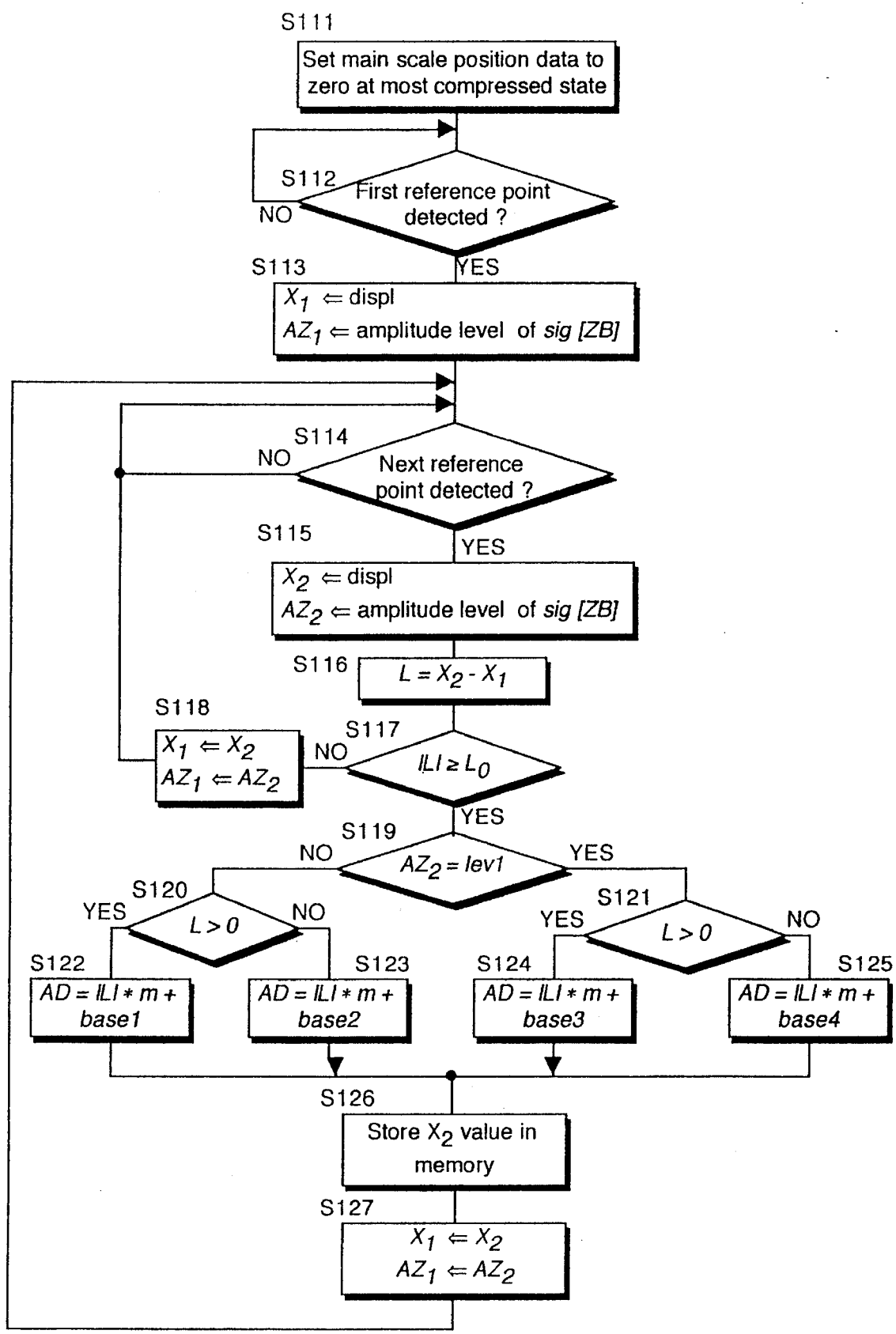
FIG. 14 is a flowchart showing a process of storing absolute positions of the reference points according to the first embodiment.

The control unit 10 therefore performs the initialization shown in FIG. 14. The algorithm used for this initialization is effectively identical to that used in the processing of FIG. 12.

First, the piston rod 1 is moved to its most compressed state, then the counter values and fine displacement corresponding to sig [A] and sig [B] are set to zero (S111). Then the piston rod 1 is elongated.

When the first reference point $h_1$ is detected in this process, the displacement of the piston rod 1 detected from the main scale 2 at that time is stored in the parameter $X_1$, and the amplitude level of sig [ZB] is stored in the parameter $AZ_1$ (S113).

While the piston rod 1 is elongating from its most compressed state to its middle position, L>0 and the amplitude level of sig [ZB]=lev 1. After detecting the reference point $h_2$, therefore, the address AD is computed in a step S124 every time a new reference point is detected. The contents of the parameter $X_2$ are then shifted to the storage location indicated by this address (S126), $X_2$ is shifted to $X_1$, and the value of $AZ_2$ is shifted to $AZ_1$ (S127). Also, processing after detection of the second reference point is repeated (S114–127).

Figure 13:
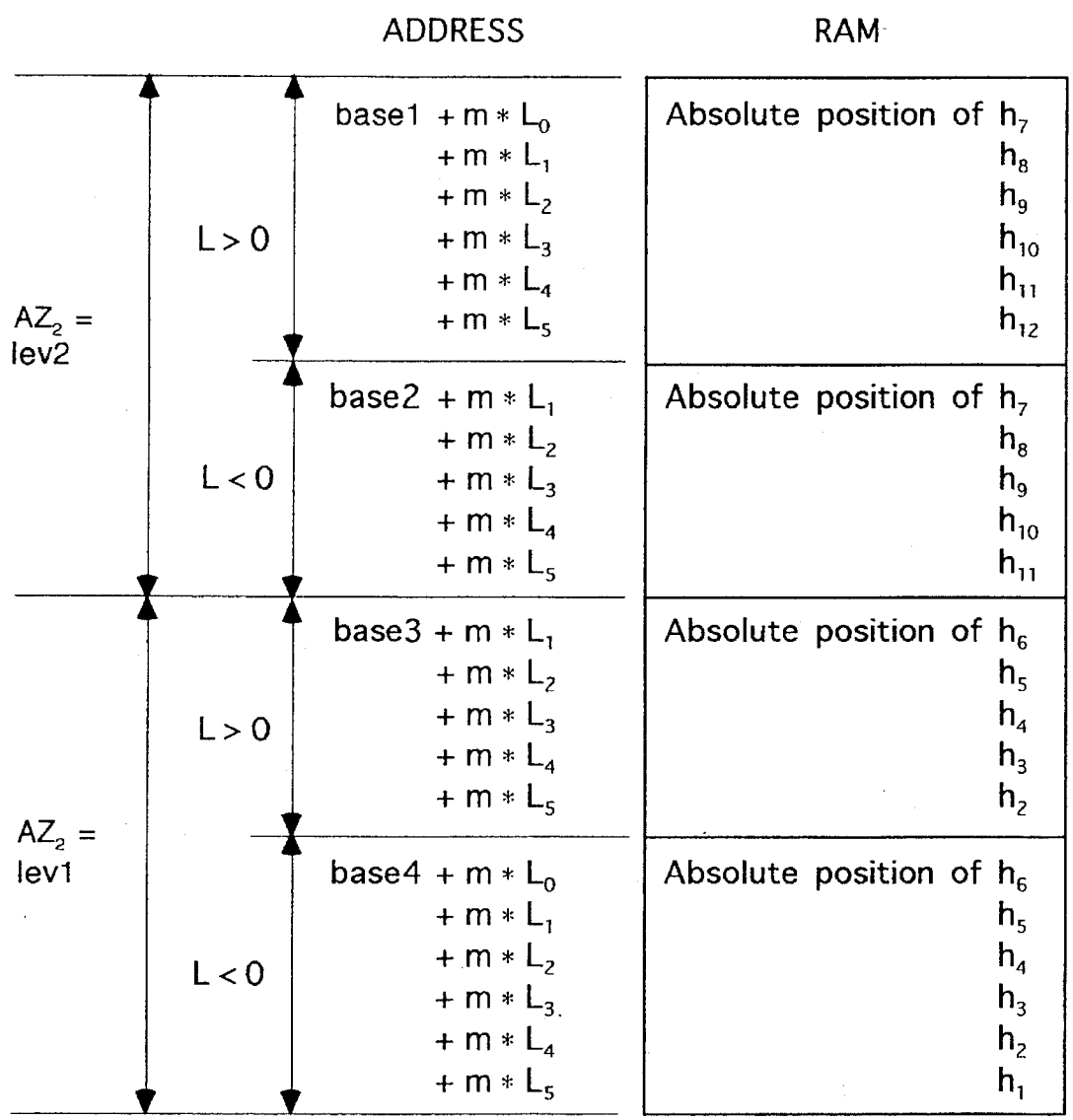
FIG. 13 is an explanatory diagram showing storage addresses for absolute positions of the reference points according to the first embodiment.

Therefore, when the piston rod 1 reaches the middle position, absolute value data for each of the reference points $h_2$ to $h_6$ are stored in 5 addresses based on base 3 in FIG. 13.

Likewise, from when the piston rod 1 is in the middle to when it reaches its most elongated position, L>0 and the amplitude level of sig [ZB]=lev 2, so the address AD is calculated in a step S122. When the piston rod 1 returns from its most elongated position to the middle position, L<0 and the amplitude level of sig [ZB]=lev 2, so the address AD is calculated in a step 123. When the piston rod returns from its middle position to its most compressed position, L<0 and the amplitude level of sig [ZB]=lev 1, so the address AD is calculated in a step S125. The contents of the parameter $X_2$ at each of these times are respectively stored in storage locations indicated by the address AD.

Therefore, when the piston rod 1 executes one complete cycle between its most compressed position and its most elongated position, absolute position data for $h_1$–$h_{12}$ are stored in all the addresses shown in FIG. 13.

As shown in FIG. 13, the reason why two absolute positions are stored in different addresses for the same reference point, is because there is a slight error in the detection tinning of the reference point according to the displacement direction (elongation or compression) of the piston rod 1. If the address is changed according to the displacement direction and data are stored separately in each address, this slight error arising from the difference in the displacement direction can be eliminated.

In this way, the absolute positions stored in the RAM 31 are retained by battery back-up even after power to the control unit 10 is interrupted.

Even if the piston rod 1 moves for some reason after the power to the control unit 10 is interrupted, therefore, if the piston rod 1 is displaced through a short distance when the power is restored, and any two adjacent reference points are detected, the displacement detected from the main scale 2 at that time may be corrected so that it agrees with the actual position of the piston rod 1. The effect of errors arising before power is restored are therefore eliminated, and high precision detection is performed thereafter until the power is interrupted again.

Battery back-up after a power cut need be applied only to the RAM 31 which stores the absolute positions and the peak values of sig [ZA], sig [ZB], and the RAM 19 which stores peak values of sig [A] and sig [B], so there is no need to scale up the capacity of the back-up battery.

There are two depths of the non-magnetic parts 7 of the subscale 6, so reference points having the same interval can be set to the left and right of the middle position as shown in FIG. 1. If the reference points on the subscale 6 are set so that all the intervals are different as in the conventional case, there is necessarily a large difference between the minimum interval and maximum interval, and the average displacement of the piston rod 1 required to detect absolute positions is large. By dividing the subscale 6 to the left and right as hereinabove described, however, the difference between the minimum interval and maximum interval between the reference points becomes smaller, so the displacement of the piston rod 1 required to detect absolute positions can be made small.

In FIG. 1, there is only one minimum reference point interval $L_0$, but it is possible to provide two as shown in FIG. 2. Further, if there are three or more different depths of the non-magnetic parts 7, the same number of reference point intervals as the number of depths may be provided.

As the calculation of the reference point interval L uses high precision displacement data (calculated in 0.01 mm units), based on the output signal from the magnetic sensor 5, the difference between reference point intervals (e.g. $L_2-L_1$) can be made small. It is sufficient that the difference between reference point intervals be larger than the minimum unit displacement (i.e. the unit of fine displacement) detected from the main scale 2.

Moreover, as the displacements detected from the main scale 2 with respect to the reference points in the initialization stage, are used for the absolute positions, the precision of the absolute positions is also good.

When any two adjacent reference points are detected after restoring power, the displacement detected from the main scale 2 with respect to the second reference point may be converted to an absolute position every time the power is restored, but this conversion may be performed any number of times as necessary. For example, if the interval between two adjacent reference points is calculated, and the displacement with respect to the second reference point does not match the corresponding absolute position even after it is converted when power is restored as hereintofore described, the displacement should be converted to an absolute position.

To prevent the piston rod 1 from reaching its most elongated position or its most compressed position, provision may be made for an alarm to be emitted when the reference points $h_1$ and $h_{12}$ which are closest to these positions are detected. For example, from the sign of two adjacent reference points and the amplitude level of sig [ZB], it can be detected whether the piston rod 1 is moving past $h_1$ toward the most compressed position, or whether it is moving past $h_{12}$ toward the most elongated position, this information then being sent to external devices.

In FIG. 1, six different reference intervals ($L_0$–$L_5$) were symmetrically arranged to the left and right of the middle of the piston rod 1 as center, and the reference point interval was made to progressively increase from the center toward the outside. The reference intervals may however be unsymmetrically arranged (so that they become progressively smaller towards the left of the figure from the center of the full stroke), or alternatively they may be arranged without any order, i.e. $L_0$, $L_5$, $L_2$, $L_1$ . . .

Further, the non-magnetic parts 7 of the subscale 6 were all given the same width $L_0/2$, however this width may be greater or lesser than $L_0/2$ provided the minimum reference interval $L_0$ call be identified, or each of the parts 7 may have a different width. $L_0$ can be set independently from the pitch interval P of the main scale 2.

In the aforesaid description, the center crossover point of the output signal sig [ZA] was taken as a reference point, and this was used to detect the reference point of the output signal sig [ZB] as shown in FIG. 10A and 10B. The center crossover point of the output signal sig [B] may however be taken instead, and used to detect the reference point of the output signal sig [A].

Figure 18:
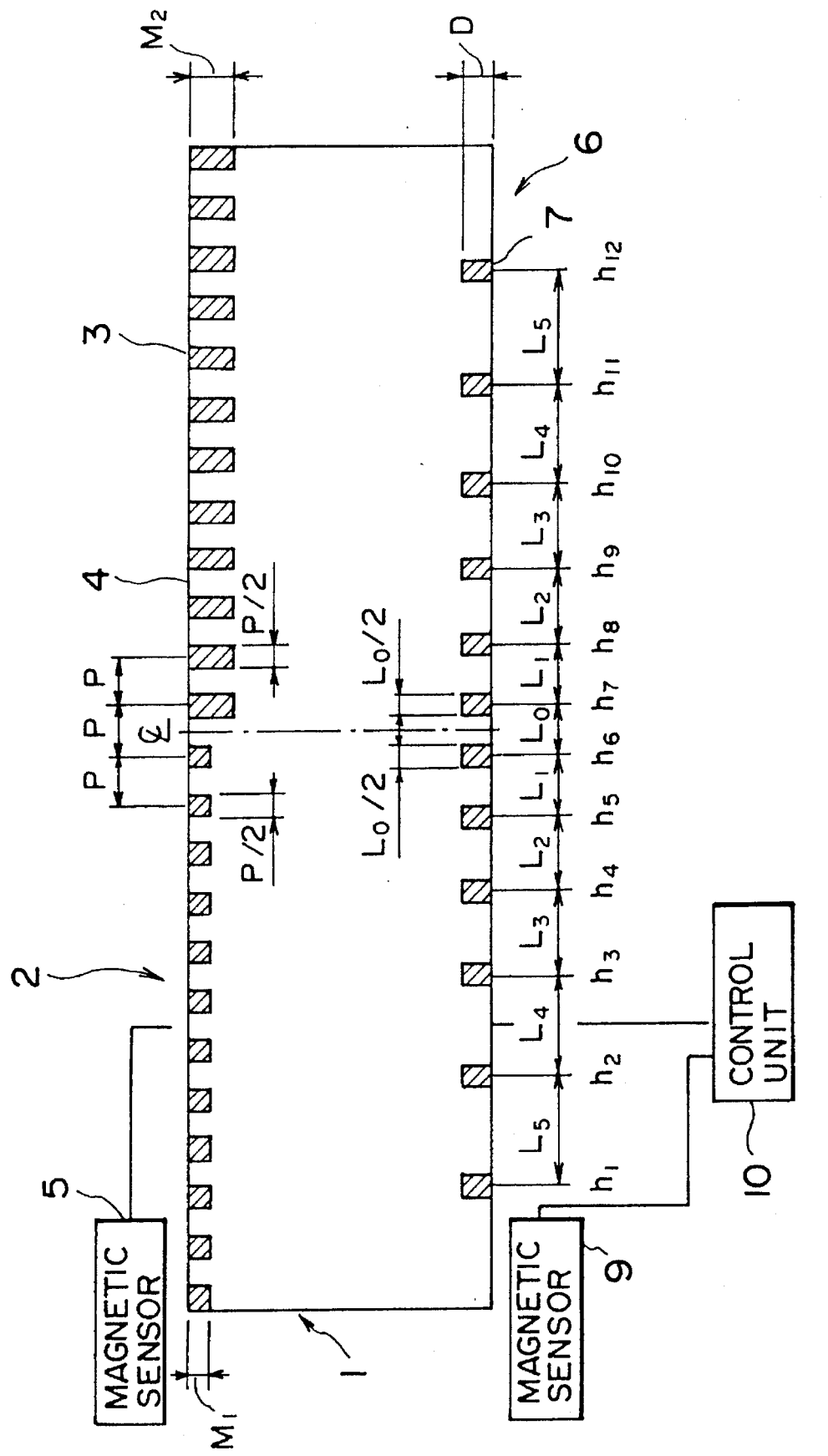
FIG. 18 is a schematic diagram of magnetic scales according to a second embodiment of this invention.

Next, a second embodiment of this invention will be described with reference to FIG. 18.

According to this embodiment, the non-magnetic parts 3 of the main scale 2 are formed with a depth $M_1$ from the furthest end to the middle, and with a greater depth $M_2$ over the remaining half of the piston rod 1. Between the non-magnetic parts 3, there are magnetic parts 4 consisting of the magnetic material of which the rod 1 is made, the non-magnetic parts 3 and magnetic parts 4 being alternately disposed at a pitch interval of ½ P.

The non-magnetic parts 7 of the subscale 6 are symmetrically disposed to the left and right of the middle of the piston rod 1 as in the first embodiment, reference points $h_1$–$h_{12}$ being set in the center of each of these non-magnetic parts 7. The non-magnetic parts 7 all have the same depth D and width $L_0/2$.

Figure 19:
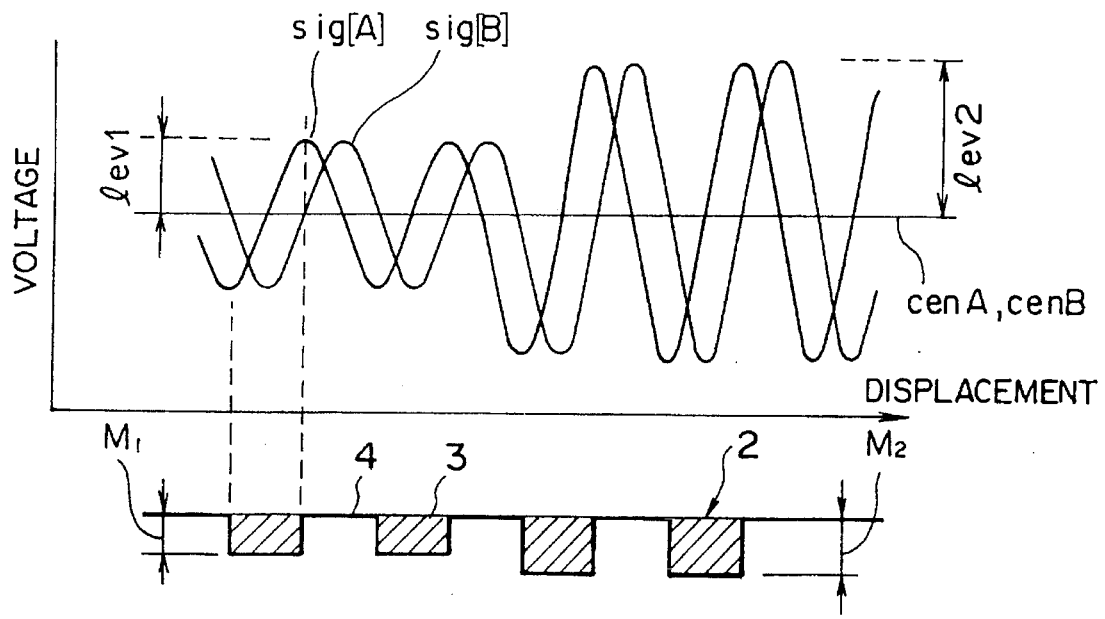
FIG. 19 is a waveform diagram showing the output signals sig [A] and sig [B] of the main scale magnetic sensor according to the second embodiment.

The output signals of the magnetic sensor 5 accompanying the displacement of the piston rod 1 are sig [A], sig [B] as shown in FIG. 19. The output signals of the magnetic sensor 9 are two signals sig [ZA], sig [ZB].

The control unit 10 comprises memories which store updated peak values every pitch interval from sig [A] and sig [B ]. The control unit 10 calculates average values of the upper and lower peak values stored in these memories, and takes them as center values cen [A], cen [B] of sig [A], sig [B]. It also finds ratios of differences between the peak values and center values with a predetermined standard value, and calculates normalization coefficients as the inverse of tiffs ratio. Finally, the amplitude levels are adjusted to be identical by multiplying the amplitudes of sig [A], sig [B] by these normalization coefficients, and the output signals sig [A], sig [B] of the magnetic sensor 5 are thereby corrected.

The relative position of the piston rod 1 is then calculated by the following method from these corrected signals.

If one of these output signals is considered to be a sine curve, the other signal may be considered to be a cosine curve. The corrected signals $y_1$ and $y_2$ in one pitch interval (0–$2\pi$) of the magnetic scale 2 are:

$y_1 = V_1 * \sin \theta$ $y_2 = V_2 * \cos \theta$ where $V_1$ = peak voltage value $V_2$ = peak voltage value If the gain is adjusted so that $V_1 = V_2$:

$\tan \theta = \sin \theta / \cos \theta = y_1 / y_2$

The angle $\theta$ between the corrected signals $y_1$, $y_2$ is therefore:

$\theta = \tan^{-1}(y_1/y_2)$

The fine displacement of the piston rod 1, i.e. the displacement position of the piston rod 1 in one pitch interval, is:

$\Delta L = (p/2\pi) * \theta$ where p = distance of one pitch interval.

The coarse displacement of the piston rod 1, i.e. the displacement of the piston rod 1 in ½ pitch interval units, is found by counting the peak values or center values of the corrected signals $y_1$, $y_2$. The displacement of the piston rod 1 may therefore be found with good precision by adding this fine displacement to the coarse displacement.

The control unit 10 also detects reference points based on the output of the magnetic sensor 9.

Figure 20:
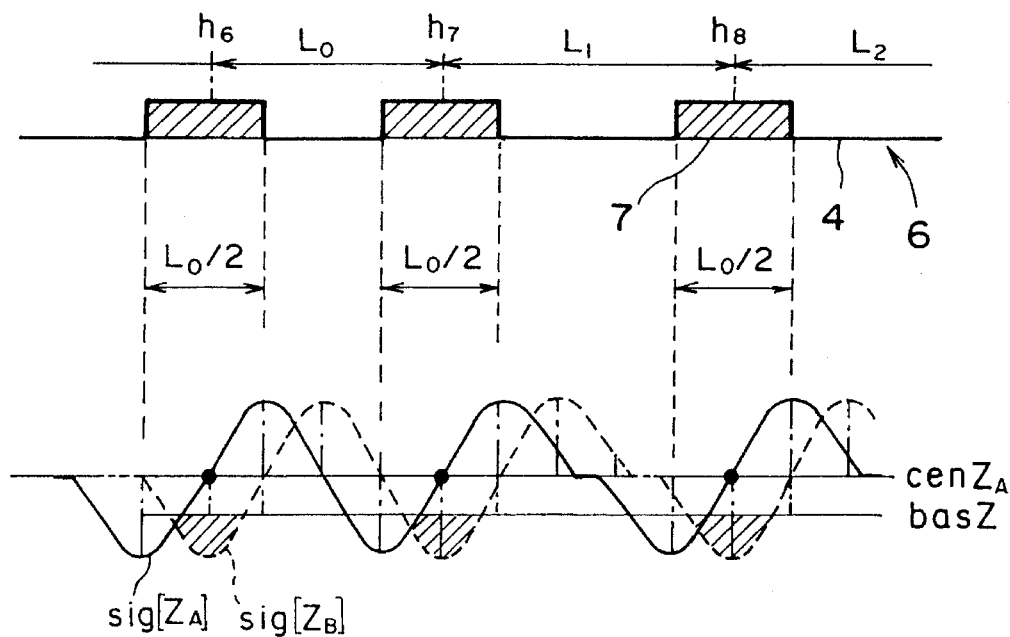
FIG. 20 is a waveform diagram showing the output signals sig [ZA] and sig [ZB] of the subscale magnetic sensor according to the second embodiment.

The output signals sig [ZA], sig [ZB] of the magnetic sensor 9 are sine waves with a 90 degrees phase difference as shown in FIG. 20. At the reference point set in the center of each of the non-magnetic parts 7, the signal sig [ZA] is the center value cen [ZA]. In theory, the signal sig [ZB] at this time should be a minimum peak value, but due to errors in forming the depth D of the non-magnetic parts 7, this is not necessarily the case. The control unit 10 therefore determines that the signal sig [ZB] is below a preset reference determining level basZ, and determines the position at which the signal sig [A] takes the center value cen [ZA] as a reference point. The calculation of the center value and peak value are performed in the same way as in the case of sig [A] and sig [B].

Figure 21:
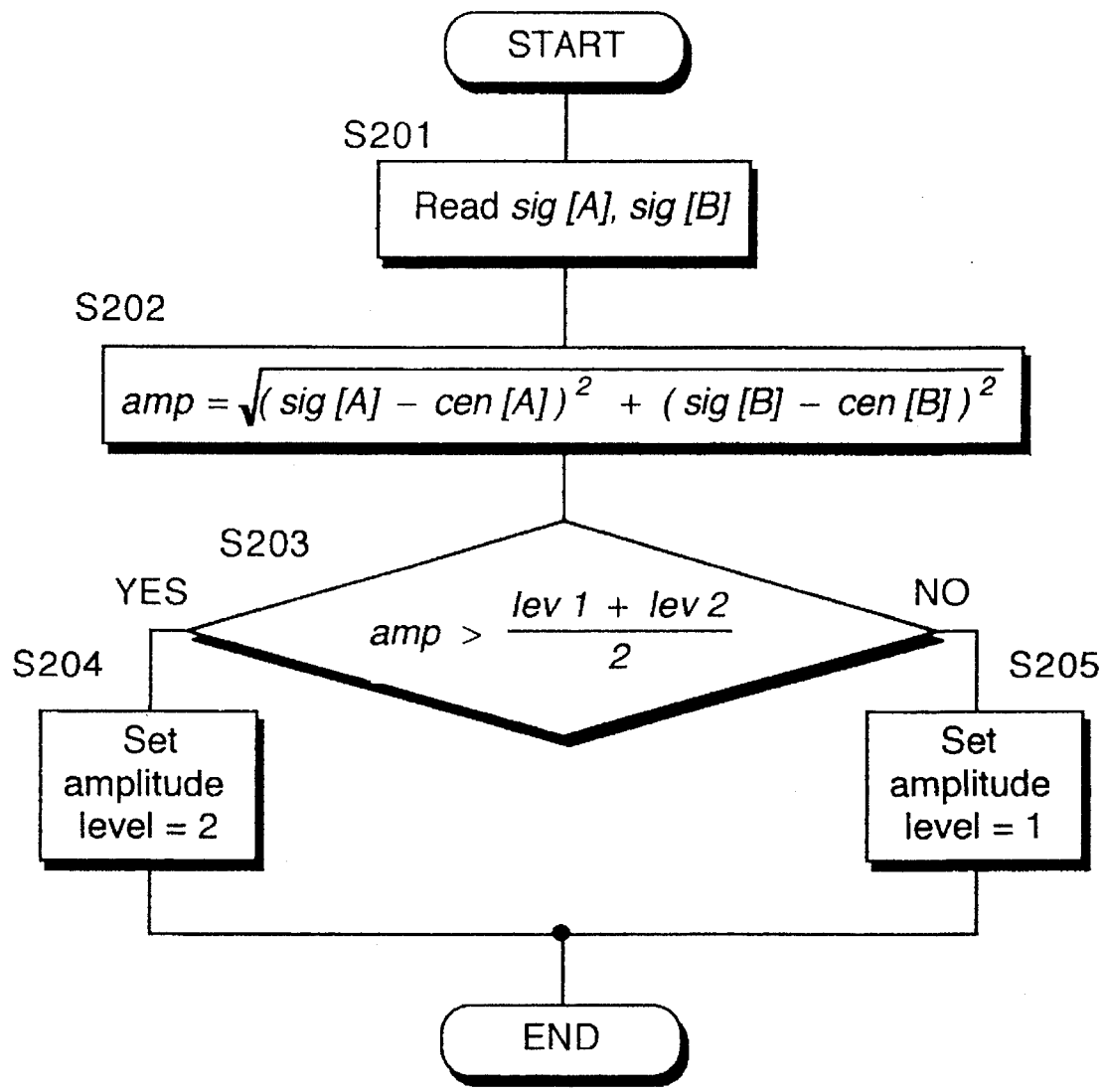
FIG. 21 is a flowchart showing a process of determining amplitude levels of the output signals sig [A] and sig [B] according to the second embodiment.

The position of the reference point thus detected is determined by its distance from the Immediately preceding reference point. As reference points are symmetrically disposed about the middle of the piston rod 1, it is first determined on which side the reference point lies with respect to the center position. This determining process is shown in the flowchart of FIG. 21.

In a step S201, the output signals sig [A], sig [B] of the magnetic sensor 5 are read, and the amplitude amp is calculated by the equation shown in S202.

As shown in FIG. 19, the amplitudes of the signals sig [A], sig [B] are lev 1 when the depth of the non-magnetic parts 3 is $M_1$, and lev 2 when this depth is $M_2$. From the magnitude of this amplitude, it can be determined on which side the detected reference point lies with respect to the middle of the piston rod 1. In a step S203, the average of preset standard values of lev 1 and lev 2 are compared with the amplitude amp. If the amplitude amp is the larger, the amplitude level is set to 2 in a step S204, and if it is the smaller, the amplitude level is set to 1 in a step S205. In FIG. 19, the amplitude level 1 is on the left of the middle position, while the amplitude level 2 is on the right.

Figure 22:
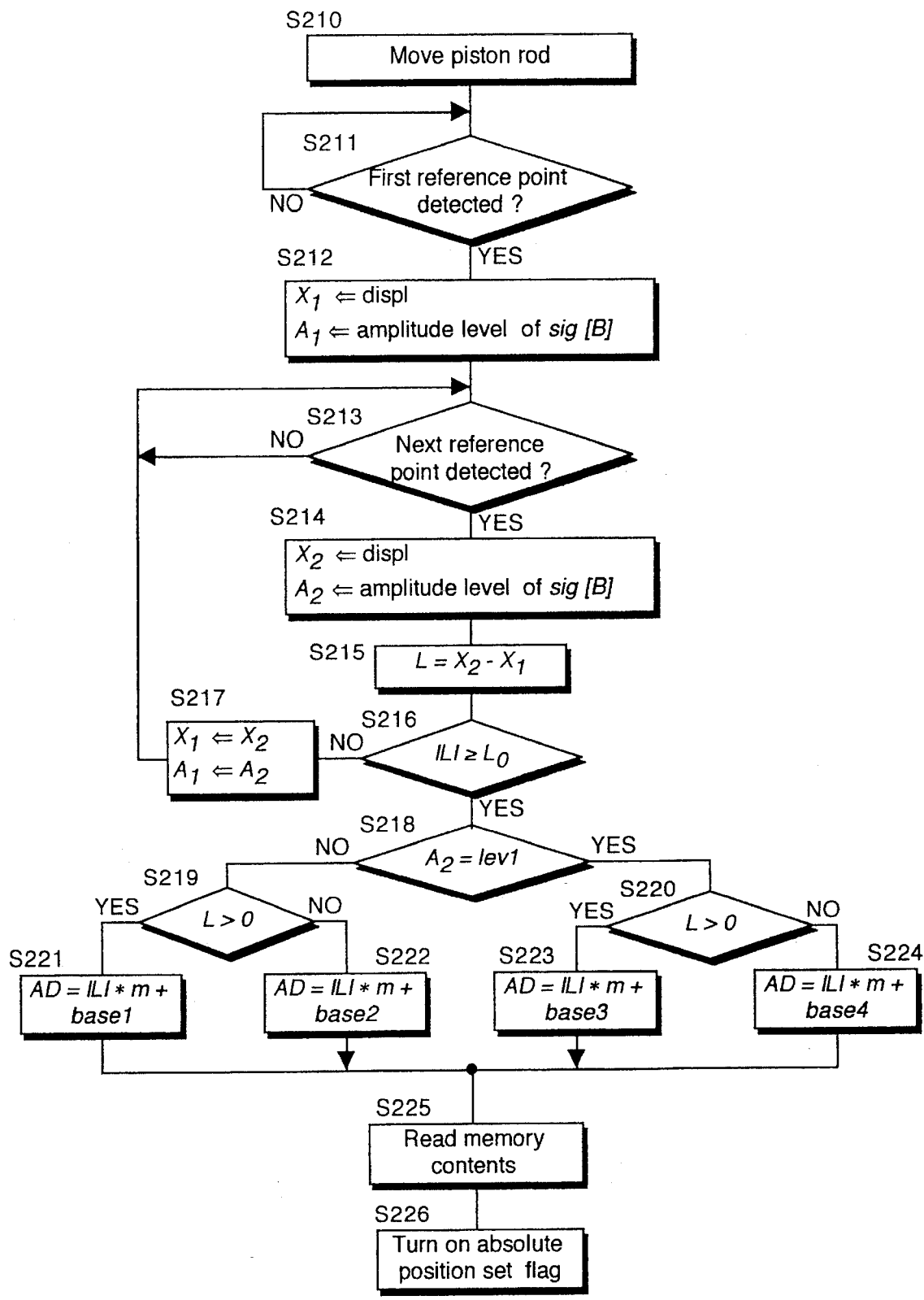
FIG. 22 is a flowchart showing a reference point detection process according to the second embodiment.

Next, file processing performed by the control unit 10 after power to file position detector is restored until the absolute position of the reference point is detected, will be described according to the flowchart of FIG. 22.

When the piston rod 1 is moved (S210), it is determined whether or not the output signal sig [ZA] of the magnetic sensor 9 is the center value cen [ZA], and whether the output signal sig [ZB] does not exceed basZ (S211). The first reference point is detected according to this determining. When the first reference point is detected, in a step S212, the displacement of the piston rod 1 at that time, i.e. a relative position computed according to the hereintofore described method based on the output signals sig [A], sig [B] of the magnetic sensor 5, is stored in the memory as a parameter $X_1$. The amplitude level of the output signal sig [B] is also stored in the memory as a parameter $A_1$.

The piston rod 1 is then moved again, and a second reference point is determined in the same way as in the step S211.

When the second reference point is detected, a relative position is stored in the memory as a parameter $X_2$, and an amplitude level of the output signal sig [B] is stored in the memory as a parameter $A_2$ in a step S214 in the same way as in the step S212.

In a step S215, the interval between the first and second reference points is calculated from these parameters $X_2$, $X_1$.

In a step S216, the absolute value of the interval L and the minimum interval $L_0$ of the subscale 6 are compared. If the interval L is greater than $L_0$, the program proceeds to a step S218, while if the interval L is less than $L_0$, the values of the parameters $A_1$, $X_1$ are updated in a step S217, and the second reference point is detected again.

In the latter case, as the first reference point passes the magnetic sensor 5 twice due to the displacement of the piston rod 1, it is impossible to specify the absolute position precisely, so detection of the second reference point starting from the step S213 is repeated.

If the detection result of the step S216 is affirmative, it is determined in the step S218, whether or not the amplitude level $A_2$ of the second reference point is lev 1. It can therefore be determined whether the second reference point lies in the range $h_1$–$h_6$, or the range $h_7$–$h_{12}$.

If the result of this determining is affirmative, i.e. the second reference point lies the range $h_1$–$h_6$, the program proceeds to a step S220, while if it is negative, i.e. the second reference point lies in the range $h_7$–$h_{12}$, the program proceeds to a step S219.

In the steps S219 and S220, the direction of displacement of the piston rod 1 is determined from the sign of the interval L between the reference points.

Four cases are distinguished according to the determining result of the steps S219 and S220. These four cases correspond to combinations of whether the second reference point lies to the left or right of the middle of the piston rod 1, and whether the piston rod 1 is displaced to the left or right.

In the steps S221–224, the address of the memory in which the absolute position of the second reference point is stored is found corresponding to these four cases.

Figure 23:
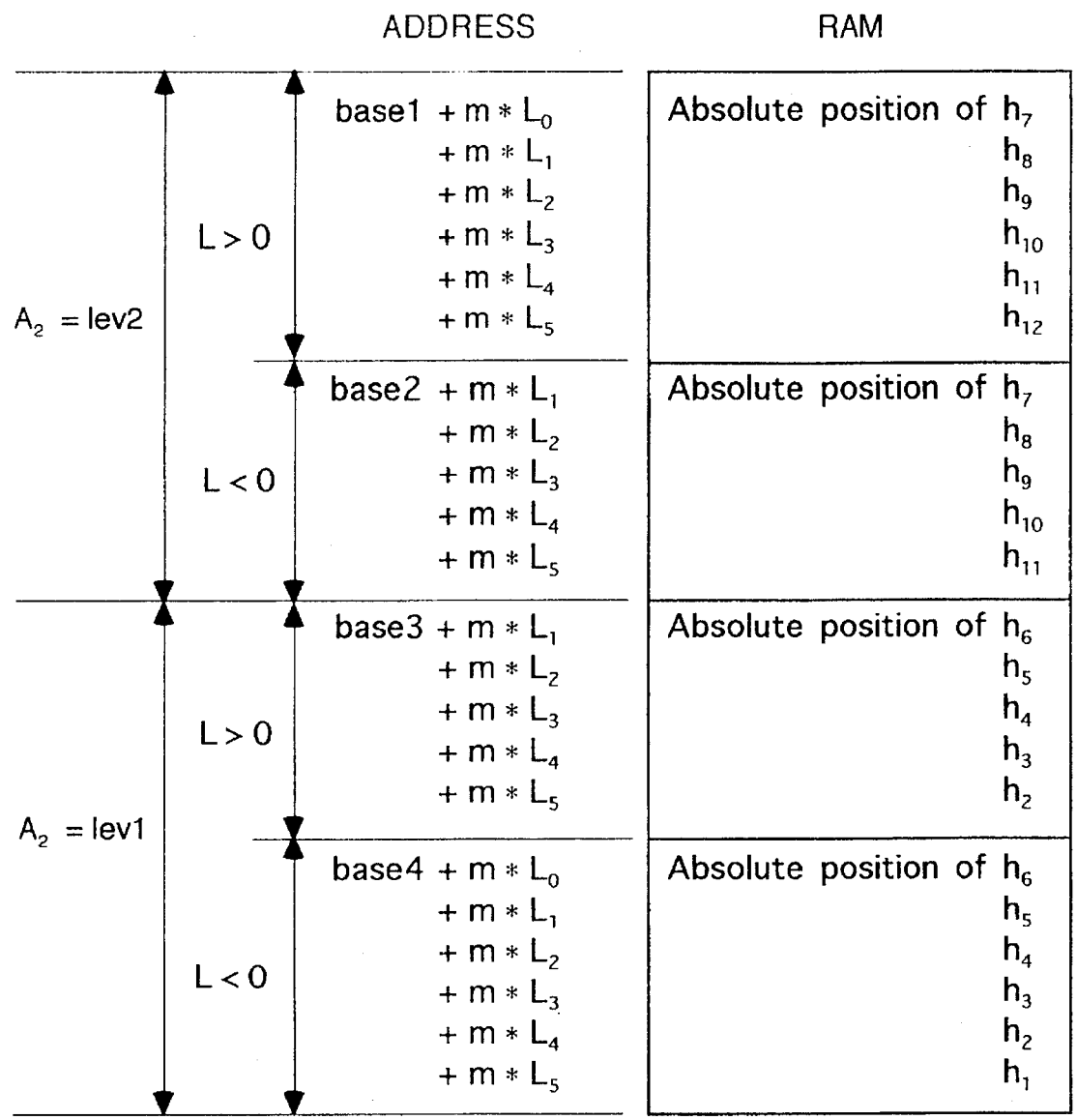
FIG. 23 is an explanatory diagram showing storage addresses for absolute positions of the reference points according to the second embodiment.

All the absolute positions of the reference points $h_1$–$h_{12}$ are therefore stored in advance in memories. The addresses of these memories in which these absolute positions $h_1$–$h_{12}$ are stored, are obtained by adding processing by the preset constants base 1–base 4 and m obtained in the steps S221–224, to the absolute value of the interval L obtained in the step S215. The addresses of the memories in which the absolute positions $h_1$–$h_{12}$ are stored, are therefore preset as shown in FIG. 23. The absolute value of the interval L found in the step S215 is equal to one of the values $L_0$–$L_5$, so if the above four cases can be distinguished, the addresses of the memories can be identified from the absolute value of the interval L and the amplitude level of sig [B]. The base 1–base 4 and m are constants for converting absolute values of the interval L to addresses.

Even if the absolute value of the interval L is the same, the values of base 1–base 4 are set according to whether sign of the interval L is positive or negative and to the amplitude level of sig [B], so that the indicated addresses are different. As shown in FIG. 23, the absolute position of each reference point is stored in different addresses. The values stored for the same reference point are not necessarily identical, because the detection position of the reference point, i.e. the position at which the signal sig [ZA] is equal to the center value cen [ZA], may slightly differ depending on the displacement direction of the piston rod 1. In order to store the precise position of reference points $h_1$–$h_{12}$, therefore, different addresses are prodded for the same reference point according to the displacement direction of the piston rod 1

The contents of the RAM 31 are then searched by means of the calculated addresses AD, and the absolute positions stored in the corresponding addresses are read.

Further, computed displacements (e.g. counter values) are rewritten based on the output signal from the magnetic sensor 5 when the second reference point is detected (S225). This rewriting of displacement data is performed only once after power is restored.

If the piston rod 1 moves for some reason after the power is interrupted, the actual displacement positions of the rod 1 after movement will no longer match the displacements which are computed based on the output of the magnetic sensor 5. However, by reciting the displacement data using this absolute position data, they will again agree. This means that the absolute positions are reset each time the power is restored.

When the rewriting of absolute position data is complete, the CPU 14 outputs this information to external devices (S226). In this way, position detection from when power is restored to when absolute positions are rewritten, is distinguished from subsequent position detection.

The process of the initialization of the absolute position data in RAM 31 is similar to that of the first embodiment shown in the in FIG. 14.

According also to this embodiment, the subscale 6 is divided to the left and right in order to minimize the difference between minimum and maximum reference point intervals, and the displacement of the piston rod 1 required to detect the absolute position is reduced.

Figure 24:
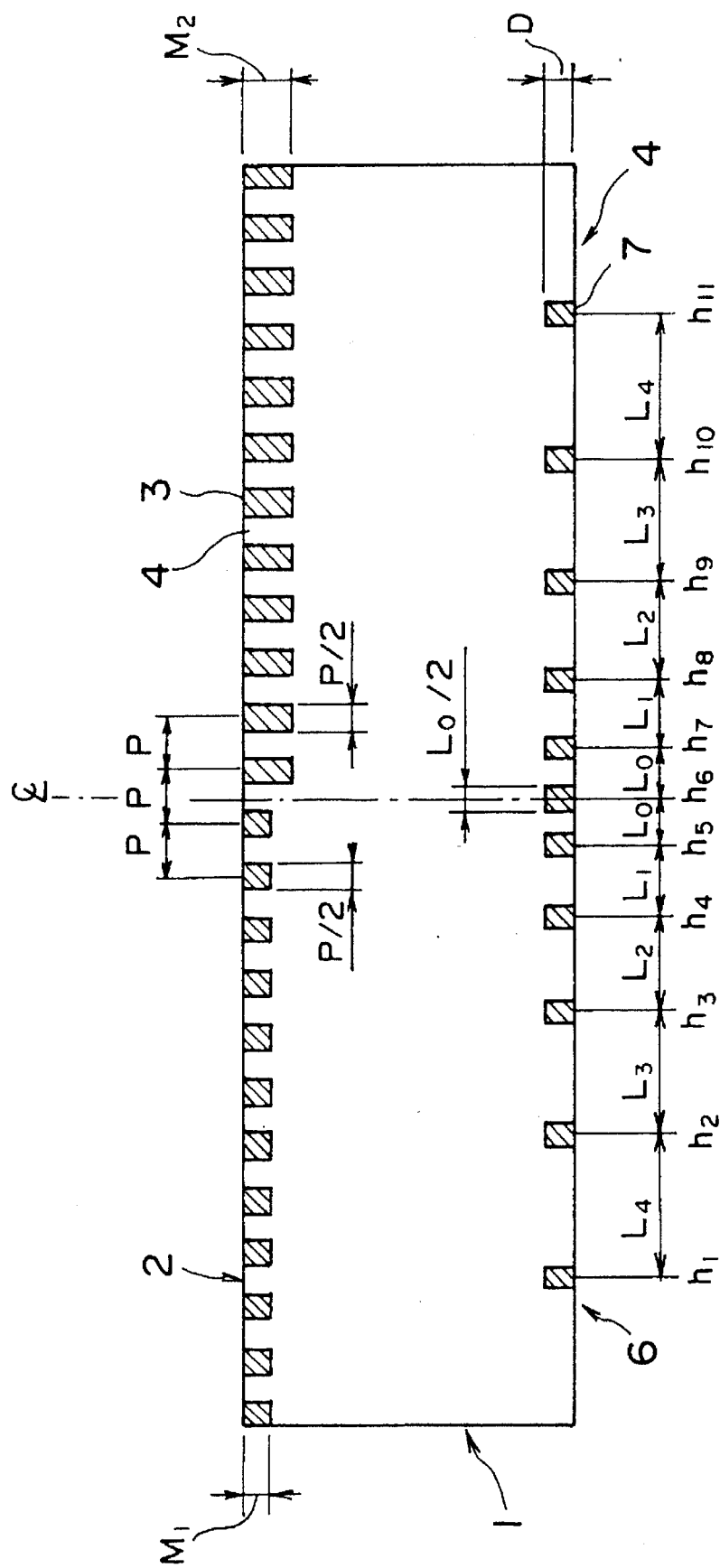
FIG. 24 is similar to FIG. 17, but showing a different arrangement of the subscale.

Insofar as concerns the subscale 6, the reference points $h_1$–$h_5$ and $h_7$–$h_{11}$ may also be disposed at intervals $L_0$–$L_4$ respectively to the left and right of a reference point in the middle of the piston rod 1 as shown in FIG. 24. Further, instead of having the interval between reference points on the subscale 6 progressively increase from the middle towards the outside, they may for example be arranged in a random fashion such as $L_0$, $L_5$, $L_3$, $L_1$.

What is claimed:

1. An axial position detector for a rod made of magnetic material, comprising a first magnetic scale comprising a plurality of non-magnetic parts arranged axially on the rod at equidistant intervals, a second magnetic scale parallel to said first scale comprising a plurality of non-magnetic parts arranged axially on the rod at unequal intervals, a first magnetic sensor for outputting a signal according to a positional change of the non-magnetic parts of said first magnetic scale, a second magnetic sensor for outputting a signal according to a positional change of the non-magnetic parts of said second magnetic scale, said magnetic sensors being respectively disposed in fixed positions facing said magnetic scales, means for separately memorizing absolute positions of the non-magnetic parts on said second magnetic scale in advance, means for detecting an interval between the non-magnetic parts passing said second sensor based on the output signal from said second sensor, means for identifying a non-magnetic part which has passed based on said detected interval, means for calculating a displacement amount of the rod from said identified non-magnetic part to its current position based on the output signal from said first sensor, and means for calculating the current position of the rod from the absolute position of the identified non-magnetic part and the calculated displacement, characterized in that:

the non-magnetic parts of said second magnetic scale are symmetrically arranged on both sides of a predetermined position on the rod, and said identifying means comprises means for distinguishing on which side of said predetermined position said second magnetic sensor is situated and means for identifying the non-magnetic parts based on said distinguished side and said detected interval.

2. A rod axial position detector as defined in claim 1, wherein the non-magnetic parts of said first scale have different depths on either side of said predetermined position on said rod, said first magnetic sensor outputs a signal whereof a signal level depends on the depths of the non-magnetic parts on said first scale, and said distinguishing means comprises means for distinguishing on which side of said predetermined position said first magnetic sensor is situated based on the level of the output signal from said first magnetic sensor.

3. A rod axial position detector as defined in claim 1, wherein the non-magnetic parts of said second scale have different depths on either side of said predetermined position on said rod, said second magnetic sensor outputs a signal whereof a signal level depends on the depths of the non-magnetic parts on said second scale, and said distinguishing means comprises means for distinguishing on which side of said predetermined position said second magnetic sensor is situated, based on the level of the output signal from said second magnetic sensor.

4. A rod axial position detector as defined in claim 1, wherein said first magnetic sensor comprises two sensor units which output two types of sine waves having a 90 degrees phase difference according to the position change of the non-magnetic parts of said first scale, and said displacement amount calculating means comprises means for calculating a center level from the peak values of one of said sine waves every pitch interval of the non-magnetic parts of said first scale, means for detecting that the non-magnetic parts of said first scale have passed said first magnetic sensor based on a comparison of said sine wave and its center level, means for counting the number of said passes the non-magnetic parts of said first scale makes, means for correcting said sine waves such that they have equal amplitude at every pitch interval, means for calculating the distance between the non-magnetic part which has passed said first magnetic sensor most recently and said first magnetic sensor by inverse trigonometric functions using said corrected sine waves, and means for calculating the displacement of said piston rod from said counted number of passes and said calculated distance.

\* \* \* \* \*